(12) United States Patent
Shimazawa et al.

(10) Patent No.: US 7,082,673 B2
(45) Date of Patent: Aug. 1, 2006

(54) METHOD OF MANUFACTURING MAGNETORESISTIVE DEVICE CAPABLE OF PREVENTING A SENSE CURRENT FROM FLOWING INTO DEAD REGIONS OF A MAGNETORESISTIVE ELEMENT, AND METHOD OF MANUFACTURING THIN-FILM MAGNETIC HEAD

(75) Inventors: Koji Shimazawa, Tokyo (JP); Koichi Terunuma, Tokyo (JP)

(73) Assignee: TDK Corporation, Tokyo (JP)

( * ) Notice: Subject to any disclaimer, the term of this patent is extended or adjusted under 35 U.S.C. 154(b) by 360 days.

(21) Appl. No.: 10/670,470

(22) Filed: Sep. 26, 2003

(65) Prior Publication Data

US 2004/0075523 A1     Apr. 22, 2004

Related U.S. Application Data

(62) Division of application No. 09/920,821, filed on Aug. 3, 2001, now Pat. No. 6,657,826.

(30) Foreign Application Priority Data

Apr. 25, 2001 (JP) ............................. 2001-128485

(51) Int. Cl.
   *G11B 5/127* (2006.01)
   *H04R 31/00* (2006.01)
(52) U.S. Cl. ............... 29/603.15; 29/603.07; 29/603.13; 29/603.14; 29/603.16; 29/603.18; 204/192.15; 216/22; 216/48; 360/316; 360/324.11; 360/324.12; 360/324.2; 427/127; 427/128
(58) Field of Classification Search ............. 29/603.07, 29/603.13–603.16, 603.18; 360/324.1, 324.11, 360/324.12, 324.2, 316; 427/127–131; 216/22, 216/48; 204/192.15
See application file for complete search history.

(56) References Cited

U.S. PATENT DOCUMENTS 5,438,470 A     8/1995 Ravipati et al. ............ 360/322

(Continued)

FOREIGN PATENT DOCUMENTS

JP     8-45037 A     2/1996

(Continued)

OTHER PUBLICATIONS

"Fabrication and characterization of giant magnetoresistive elements with an integrated test coil"; Kools, J.C.S.; Ruigrok, J.J.M.; Postma, B.; De Nooijer, M.C.; Folkerts, W.; Magnetics, IEEE Transactions on vol. 33, Issue 6; Nov. 1997; pp.: 4513-4521.*

(Continued)

*Primary Examiner*—Paul D. Kim
(74) *Attorney, Agent, or Firm*—Oliff & Berridge, PLC

(57) ABSTRACT

A magnetoresisive device comprises: an MR element having two surfaces that face toward opposite directions and two side portions that face toward opposite directions; two bias field applying layers that are located adjacent to the side portions of the MR element and apply a longitudinal bias magnetic field to the MR element; and two electrode layers that are located adjacent to one of the surfaces of each of the bias field applying layers and feed a sense current to the MR element. The electrode layers overlap the one of the surfaces of the MR element. The magnetoresistive device further comprises two nonconductive layers that are located between the one of the surfaces of the MR element and the two electrode layers and located in two regions that include ends of the MR element near the side portions thereof, the two regions being parts of the region in which the electrode layers face toward the one of the surfaces of the MR element.

10 Claims, 13 Drawing Sheets

U.S. PATENT DOCUMENTS

| | | | |
|---|---|---|---|
| 5,876,843 A * | 3/1999 | Ishiwata | 428/209 |
| 6,040,962 A | 3/2000 | Kanazawa et al. | 360/322 |
| 6,118,624 A * | 9/2000 | Fukuzawa et al. | 360/324.12 |
| 6,141,190 A | 10/2000 | Nakamoto et al. | 360/324 |
| 6,344,953 B1 | 2/2002 | Kautzky | 360/322 |
| 6,587,315 B1 * | 7/2003 | Aoki et al. | 360/322 |
| 6,663,987 B1 * | 12/2003 | Kakihara | 428/811.2 |

FOREIGN PATENT DOCUMENTS

| | | |
|---|---|---|
| JP | 9-282618 A | 10/1997 |
| JP | 11-31313 A | 2/1999 |
| JP | 11224411 A * | 8/1999 |
| JP | 2000-76629 A | 3/2000 |
| JP | 2000-285418 A | 10/2000 |
| JP | A 2000-285418 | 10/2000 |

OTHER PUBLICATIONS

"Microstructures Process Techniques And Development Of Prototype Head With Reduced Read Core Width" by Tanaka et al.; The 9$^{th}$ Research Workshop of The Second Research Division of Association of Super-Advanced Electronics Technologies; Aug. 29, 2000; pp. 65-76. (with partial translation).

* cited by examiner

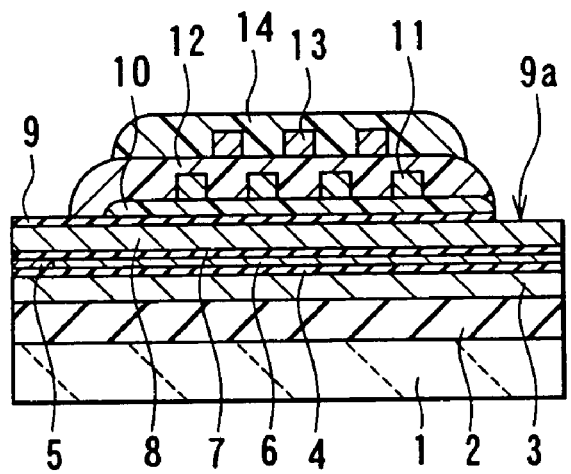
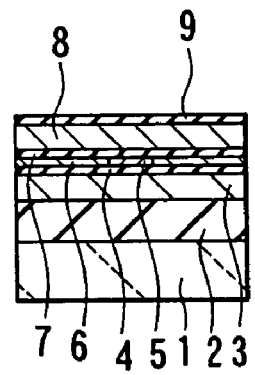
FIG. 6A  FIG. 6B
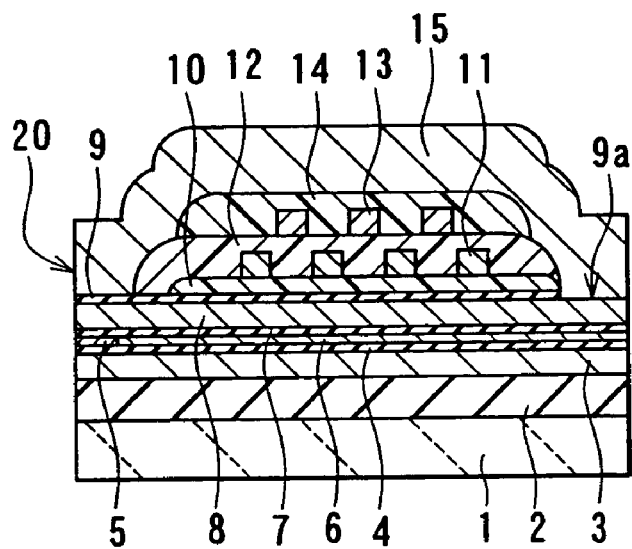
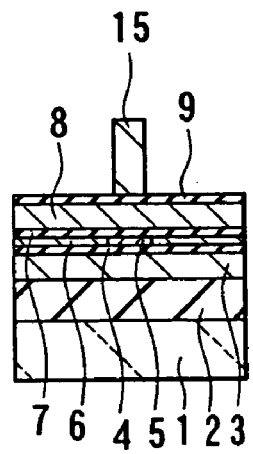
FIG. 7A  FIG. 7B

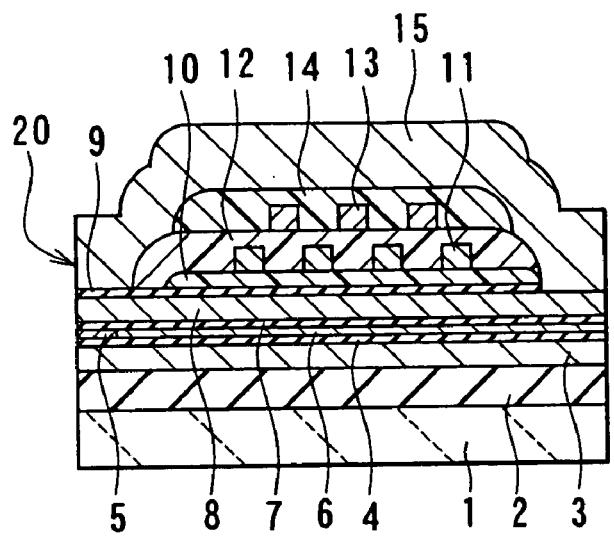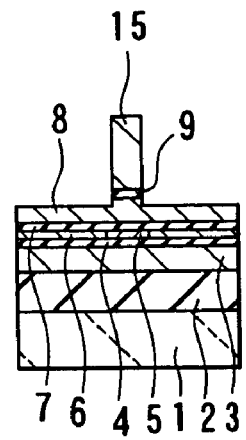
FIG. 8A    FIG. 8B
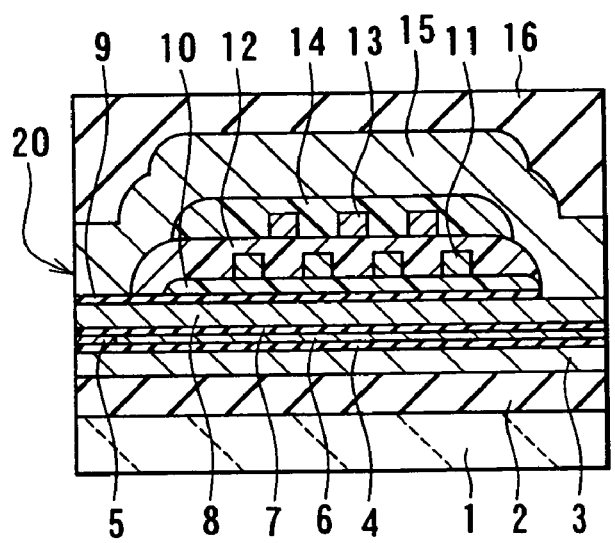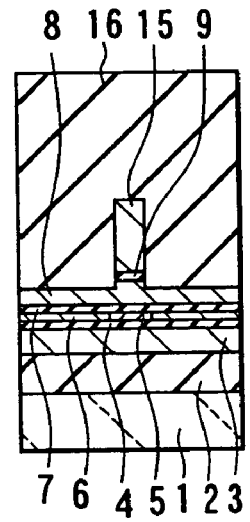
FIG. 9A    FIG. 9B

METHOD OF MANUFACTURING MAGNETORESISTIVE DEVICE CAPABLE OF PREVENTING A SENSE CURRENT FROM FLOWING INTO DEAD REGIONS OF A MAGNETORESISTIVE ELEMENT, AND METHOD OF MANUFACTURING THIN-FILM MAGNETIC HEAD

This is a Division of application Ser. No. 09/920,821 filed Aug. 3, 2001, now U.S. Pat. No. 6,657,826. The entire disclosure of the prior application is hereby incorporated by reference herein in its entirety.

BACKGROUND OF THE INVENTION

1. Field of the Invention

The present invention relates to a magnetoresistive device that incorporates a magnetoresistive element and a method of manufacturing such a magnetoresistive device, a thin-film magnetic head that incorporates a magnetoresistive device that functions as a device for reading a magnetic signal and a method of manufacturing such a thin-film magnetic head, a head gimbal assembly, and a hard disk drive.

2. Description of the Related Art

Performance improvements in thin-film magnetic heads have been sought as areal recording density of hard disk drives has increased. Such thin-film magnetic heads include composite thin-film magnetic heads that have been widely used. A composite head is made of a layered structure including a write (recording) head having an induction-type electromagnetic transducer for writing and a read (reproducing) head having a magnetoresistive (MR) element for reading.

MR elements include: an AMR element that utilizes the anisotropic magnetoresistive effect; a GMR element that utilizes the giant magnetoresistive effect; and a TMR element that utilizes the tunnel magnetoresistive effect.

Read heads that exhibit a high sensitivity and a high output are required. Read heads that meet these requirements are GMR heads incorporating spin-valve GMR elements. Such GMR heads have been mass-produced.

In general, the spin-valve GMR element incorporates: a nonmagnetic layer having two surfaces that face toward opposite directions; a soft magnetic layer located adjacent to one of the surfaces of the nonmagnetic layer; a ferromagnetic layer located adjacent to the other one of the surfaces of the nonmagnetic layer; and an antiferromagnetic layer located adjacent to one of the surfaces of the ferromagnetic layer that is farther from the nonmagnetic layer. The soft magnetic layer is a layer in which the direction of magnetization changes in response to the signal magnetic field and called a free layer. The ferromagnetic layer is a layer in which the direction of magnetization is fixed by the field supplied from the antiferromagnetic layer and called a pinned layer.

Another characteristic required for the read head is a small Barkhausen noise. Barkhausen noise results from transition of a domain wall of a magnetic domain of an MR element. If Barkhausen noise occurs, an abrupt variation in output results, which induces a reduction in signal-to-noise (S/N) ratio and an increase in error rate.

To reduce Barkhausen noise, a bias magnetic field (that may be hereinafter called a longitudinal bias field) is applied to the MR element along the longitudinal direction. To apply the longitudinal bias field to the MR element, bias field applying layers may be provided on both sides of the MR element, for example. Each of the bias field applying layers is made of a hard magnetic layer or a laminate of a ferromagnetic layer and an antiferromagnetic layer, for example.

In the read head in which bias field applying layers are provided on both sides of the MR element, two electrode layers for feeding a current used for magnetic signal detection (that may be hereinafter called a sense current) to the MR element are located to touch the bias field applying layers.

As disclosed in Published Unexamined Japanese Patent Application Heisei 11-31313 (1999), it is known that, when the bias field applying layers are located on both sides of the MR element, regions that may be hereinafter called dead regions are created near ends of the MR element that are adjacent to the bias field applying layers. In these regions the magnetic field produced from the bias field applying layers fixes the direction of magnetization, and sensing of a signal magnetic field is thereby prevented. Such dead regions are created in the free layer of the spin-valve GMR element.

Consequently, if the electrode layers are located so as not to overlap the MR element, a sense current passes through the dead regions. The output of the read head is thereby reduced.

To solve this problem, the electrode layers are located to overlap the MR element, as disclosed in Published Unexamined Japanese Patent Application Heisei 8-45037 (1996), Published Unexamined Japanese Patent Application Heisei 9-282618 (1997), Published Unexamined Japanese Patent Application Heisei 11-31313 (1999), and Published Unexamined Japanese Patent Application 2000-76629, for example.

It is possible to reduce Barkhausen noise while a reduction in output of the read head is prevented, if the read head has a structure that the bias field applying layers are located on both sides of the MR element, and the electrode layers overlap the MR element, as described above. Such a structure is hereinafter called an overlapping electrode layer structure.

Reference is now made to FIG. 23 to FIG. 27 to describe an example of method of manufacturing a read head having the above-described overlapping electrode layer structure. In this example the MR element is a spin-valve GMR element. In the method, as shown in FIG. 23, a base layer 121, an antiferromagnetic layer 122, a pinned layer 123, a nonmagnetic layer 124, a soft magnetic layer (a free layer) 125, and a protection layer 126 are formed in this order through sputtering, for example, and stacked. After the protection layer 126 is formed, part of the top surface thereof is natural-oxidized and an oxide layer 140 is formed.

Next, as shown in FIG. 24, a resist mask 141 is formed on the oxide layer 140 through photolithography. The resist mask 141 is used for patterning the layers from the oxide layer 140 to the pinned layer 123. Next, these layers are selectively etched through ion milling, for example, using the resist mask 141, and thereby patterned.

Next, as shown in FIG. 25, on the antiferromagnetic layer 122, two bias field applying layers 127 are formed on both sides of the layers from the oxide layer 140 to the pinned layers 123 while the resist mask 141 is left unremoved.

Next, as shown in FIG. 26, the resist mask 141 is removed and the oxide layer 140 is completely removed through dry etching. Next, a conductive layer 129 is formed on the bias field applying layers 127 and the protection layer 126. The conductive layer 129 is made of a material of which electrode layers 106 described later are made.

Next, as shown in FIG. 27, a specific width of the conductive layer 129 between the two bias field applying layers 127 is etched through reactive ion etching, for example, to form a trench 130. The conductive layer 129 is divided into two by the trench 130, and the two electrode layers 106 are thus formed. In the region between the two electrode layers 106, after this etching, at least part of the protection layer 126 is natural-oxidized and made to have a high resistance, so that a high resistance layer 131 is formed.

As described above, when the overlapping electrode layer structure is adopted, it is possible to reduce Barkhausen noise while a reduction in output of the read head is prevented.

However, a problem is that it is inevitable that a sense current flows into dead regions created in the free layer even though the overlapping electrode layer structure is adopted to the spin-valve GMR element in which the pinned layer is located closer to the substrate while the free layer is located farther from the substrate.

A technique disclosed in Published Unexamined Japanese Patent Application 2000-285418 is that the overlapping electrode layer structure is adopted and high resistance layers are formed on sidewalls of the MR element so as to prevent a sense current from passing through the dead regions. However, this technique has a problem that the ability to apply a longitudinal bias field to the MR element is reduced.

OBJECT AND SUMMARY OF THE INVENTION

It is an object of the invention to provide a magnetoresistive device and a methods of manufacturing the same, a thin-film magnetic head and a method of manufacturing the same, a head gimbal assembly, and a hard disk drive for reducing Barkhausen noise while preventing a reduction in output.

A magnetoresistive device of the invention comprises: a magnetoresistive element having two surfaces that face toward opposite directions and two side portions that face toward opposite directions; two bias field applying layers that are located adjacent to the side portions of the magnetoresistive element and apply a bias magnetic field to the magnetoresistive element; two electrode layers that feed a current used for magnetic signal detection to the magnetoresistive element, each of the electrode layers being adjacent to one of surfaces of each of the bias field applying layers and overlapping one of the surfaces of the magnetoresistive element; and two nonconductive layers that are located between the one of the surfaces of the magnetoresistive element and the two electrode layers and located in two regions including ends of the magnetoresistive element near the side portions thereof, the two regions being parts of a region in which the electrode layers face toward the one of the surfaces of the magnetoresistive element.

The thin-film magnetic head of the invention comprises the above-described magnetoresistive device as a device for reading a magnetic signal.

According to the magnetoresistive device or the thin-film magnetic head of the invention, the bias field applying layers are located on both sides of the magnetoresistive element, so that Barkhausen noise is reduced. According to the invention, the two electrode layers overlap one of the surfaces of the magnetoresistive element. In addition, the two nonconductive layers are located between the one of the surfaces of the magnetoresistive element and the two electrode layers and located in the two regions that include ends of the magnetoresistive element near the side portions thereof and that are parts of the region in which the electrode layers face toward the one of the surfaces of the magnetoresistive element. As a result, it is possible to prevent a reduction in output due to the current used for magnetic signal detection that passes through the dead regions of the magnetoresistive element.

According to the magnetoresistive device or the thin-film magnetic head of the invention, the magnetoresistive element may incorporate: a nonmagnetic layer having two surfaces that face toward opposite directions; a soft magnetic layer adjacent to one of the surfaces of the nonmagnetic layer; a pinned layer, located adjacent to the other one of the surfaces of the nonmagnetic layer, whose direction of magnetization is fixed; and an antiferromagnetic layer located adjacent to one of surfaces of the pinned layer that is farther from the nonmagnetic layer, the antiferromagnetic layer fixing the direction of magnetization of the pinned layer. In addition, the soft magnetic layer may be located closer to the one of the surfaces of the magnetoresistive element than the antiferromagnetic layer.

If the magnetoresistive element has the above-mentioned configuration, each of the bias field applying layers may incorporate a first layer made of a ferromagnetic substance and a second layer made of an antiferromagnetic substance wherein the first layer is located on a side of the nonmagnetic layer, the pinned layer and the soft magnetic layer, and the second layer is located between the first layer and each of the electrode layers. In this case, the antiferromagnetic layer may have an area greater than that of each of the pinned layer, the nonmagnetic layer and the soft magnetic layer, and each of the bias field applying layers may be located between the antiferromagnetic layer and each of the electrode layers.

If the magnetoresistive element has the above-mentioned configuration, the element may further incorporate a conductive protection layer located between the soft magnetic layer and the electrode layers, and a high resistance layer that is formed through increasing the resistance of at least a part of the protection layer located in a region between the two electrode layers.

A method of the invention is provided for manufacturing a magnetoresistive device comprising: a magnetoresistive element having two surfaces that face toward opposite directions and two side portions that face toward opposite directions; two bias field applying layers that are located adjacent to the side portions of the magnetoresistive element and apply a bias magnetic field to the magnetoresistive element; and two electrode layers that feed a current used for magnetic signal detection to the magnetoresistive element, each of the electrode layers being adjacent to one of surfaces of each of the bias field applying layers and overlapping one of the surfaces of the magnetoresistive element. The method comprises the steps of: forming the magnetoresistive element; forming the two bias field applying layers; forming two nonconductive layers in two regions that include ends of the magnetoresistive element near the side portions thereof and that are parts of the one of the surfaces of the magnetoresistive element; and forming the two electrode layers such that each of the electrode layers has an area greater than that of each of the nonconductive layers and is located in the one of the surfaces of the magnetoresistive element.

A method of manufacturing a thin-film magnetic head of the invention is provided for manufacturing a thin-film magnetic head comprising a magnetoresistive device that is a device for reading a magnetic signal. The magnetoresistive device comprises: a magnetoresistive element having two surfaces that face toward opposite directions and two side portions that face toward opposite directions; two bias field applying layers that are located adjacent to the side portions of the magnetoresistive element and apply a bias magnetic field to the magnetoresistive element; and two electrode layers that feed a current used for magnetic signal detection to the magnetoresistive element, each of the electrode layers being adjacent to one of surfaces of each of the bias field applying layers and overlapping one of the surfaces of the magnetoresistive element. The method of manufacturing the thin-film magnetic head of the invention is provided for fabricating the magnetoresistive device through the use of the above-described method of manufacturing the magnetoresistive device.

According to the method of manufacturing the magnetoresistive device or the method of manufacturing the thin-film magnetic head of the invention, the bias field applying layers are located on both sides of the magnetoresistive element, so that Barkhausen noise is reduced. According to the invention, the two electrode layers overlap one of the surfaces of the magnetoresistive element. In addition, the two nonconductive layers are located between the one of the surfaces of the magnetoresistive element and the two electrode layers and located in the two regions that include ends of the magnetoresistive element near the side portions thereof and that are parts of the region in which the electrode layers face toward the one of the surfaces of the magnetoresistive element. As a result, it is possible to prevent a reduction in output due to the current used for magnetic signal detection that passes through the dead regions of the magnetoresistive element.

According to the method of manufacturing the magnetoresistive device or the method of manufacturing the thin-film magnetic head of the invention, the magnetoresistive element may incorporate: a nonmagnetic layer having two surfaces that face toward opposite directions; a soft magnetic layer adjacent to one of the surfaces of the nonmagnetic layer; a pinned layer, located adjacent to the other one of the surfaces of the nonmagnetic layer, whose direction of magnetization is fixed; and an antiferromagnetic layer located adjacent to one of surfaces of the pinned layer that is farther from the nonmagnetic layer, the antiferromagnetic layer fixing the direction of magnetization of the pinned layer. In addition, the soft magnetic layer may be located closer to the one of the surfaces of the magnetoresistive element than the antiferromagnetic layer.

If the magnetoresistive element has the above-mentioned configuration, each of the bias field applying layers may incorporate a first layer made of a ferromagnetic substance and a second layer made of an antiferromagnetic substance wherein the first layer is located on a side of the nonmagnetic layer, the pinned layer and the soft magnetic layer, and the second layer is located between the first layer and each of the electrode layers. In this case, the antiferromagnetic layer may have an area greater than that of each of the pinned layer, the nonmagnetic layer and the soft magnetic layer, and each of the bias field applying layers may be located between the antiferromagnetic layer and each of the electrode layers.

If the magnetoresistive element has the above-mentioned configuration, the element may further incorporate a conductive protection layer located between the soft magnetic layer and the electrode layers, and a high resistance layer that is formed through increasing the resistance of at least a part of the protection layer located in a region between the two electrode layers.

Ahead gimbal assembly of the invention comprises a slider that includes a thin-film magnetic head and is located to face toward a recording medium, and a suspension that flexibly supports the slider. A hard disk drive of the invention comprises a slider that includes a thin-film magnetic head and is located to face toward a circular-plate-shaped recording medium that is rotated and driven, and an alignment device that supports the slider and aligns the slider with respect to the medium. In the head gimbal assembly or the hard disk drive of the invention, the thin-film magnetic head incorporates a magnetoresistive device that is a device for reading a magnetic signal.

According to the head gimbal assembly or the hard disk drive of the invention, the magnetoresistive device comprises: a magnetoresistive element having two surfaces that face toward opposite directions and two side portions that face toward opposite directions; two bias field applying layers that are located adjacent to the side portions of the magnetoresistive element and apply a bias magnetic field to the magnetoresistive element; two electrode layers that feed a current used for magnetic signal detection to the magnetoresistive element, each of the electrode layers being adjacent to one of surfaces of each of the bias field applying layers and overlapping one of the surfaces of the magnetoresistive element; and two nonconductive layers that are located between the one of the surfaces of the magnetoresistive element and the two electrode layers and located in two regions including ends of the magnetoresistive element near the side portions thereof, the two regions being parts of a region in which the electrode layers face toward the one of the surfaces of the magnetoresistive element.

According to the head gimbal assembly or the hard disk drive of the invention, the bias field applying layers are located on both sides of the magnetoresistive element, so that Barkhausen noise is reduced. According to the invention, the two electrode layers overlap one of the surfaces of the magnetoresistive element. In addition, the two nonconductive layers are located between the one of the surfaces of the magnetoresistive element and the two electrode layers and located in the two regions that include ends of the magnetoresistive element near the side portions thereof and that are parts of the region in which the electrode layers face toward the one of the surfaces of the magnetoresistive element. As a result, it is possible to prevent a reduction in output due to the current used for magnetic signal detection that passes through the dead regions of the magnetoresistive element.

Other and further objects, features and advantages of the invention will appear more fully from the following description.

BRIEF DESCRIPTION OF THE DRAWINGS

FIG. 6A and FIG. 6B are cross sections for illustrating a step of a method of manufacturing a thin-film magnetic head of the first embodiment.

FIG. 7A and FIG. 7B are cross sections for illustrating a step that follows FIG. 6A and FIG. 6B.

FIG. 8A and FIG. 8B are cross sections for illustrating a step that follows FIG. 7A and FIG. 7B.

FIG. 9A and FIG. 9B are cross sections for illustrating a step that follows FIG. 8A and FIG. 8B.

DETAILED DESCRIPTION OF THE PREFERRED EMBODIMENTS

Figure 1:
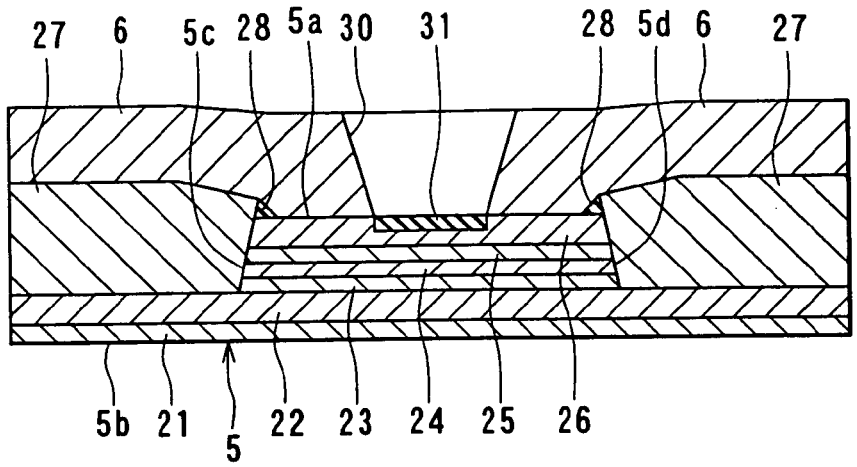
FIG. 1 is a cross section of a magnetoresistive device of a first embodiment of the invention that is parallel to the air bearing surface.

Preferred embodiments of the invention will now be described in detail with reference to the accompanying drawings.

First Embodiment

Reference is now made to FIG. 6A to FIG. 9A and FIG. 6B to FIG. 9B to describe a thin-film magnetic head and an outline of a method of manufacturing the same of a first embodiment of the invention. FIG. 6A to FIG. 9A are cross sections each orthogonal to the air bearing surface. FIG. 6B to FIG. 9B are cross sections of the pole portion each parallel to the air bearing surface.

In the manufacturing method, as shown in FIG. 6A and FIG. 6B, an insulating layer 2 made of an insulating material such as alumina ($Al_2O_3$) or silicon dioxide ($SiO_2$) whose thickness is 1 to 20 μm, for example, is formed through sputtering, for example, on a substrate 1 made of a ceramic material such as aluminum oxide and titanium carbide ($Al_2O_3$—TiC). On the insulating layer 2 a bottom shield layer 3 having a thickness of 0.1 to 5 μm, for example, is formed for making a read head. The bottom shield layer 3 is made of a magnetic material such as FeAlSi, NiFe, CoFe, CoFeNi, FeN, FeZrN, FeTaN, CoZrNb, or CoZrTa. The bottom shield layer 3 is formed through sputtering or plating.

Next, on the bottom shield layer 3, a bottom shield gap film 4 made of an insulating material such as $Al_2O_3$ or $SiO_2$ and having a thickness of 10 to 200 nm, for example, is formed through sputtering, for example. On the bottom shield gap film 4, a magnetoresistive (MR) element 5 for reading having a thickness of tens of nanometers, for example, is formed through sputtering, for example. Next, although not shown, two bias field applying layers that are located adjacent to sides of the MR element 5 are formed on the bottom shield gap film 4 through sputtering, for example. The bias field applying layers apply a longitudinal bias magnetic field to the MR element 5. Next, on the bottom shield gap film 4 and the bias field applying layers, a pair of electrode layers 6 having a thickness of tens of nanometers are formed through sputtering, for example. The electrode layers 6 are electrically connected to the MR element 5. Next, a top shield gap film 7 made of an insulating material such as $Al_2O_3$ or $SiO_2$ and having a thickness of about 10 to 200 nm, for example, is formed through sputtering, for example, on the bottom shield gap film 4 and the MR element 5.

The above-mentioned layers making up the read head are patterned through the general etching method using a resist pattern, the liftoff method or the method using both etching and liftoff.

Next, on the top shield gap film 7, a top-shield-layer-cum-bottom-pole-layer (called a top shield layer in the following description) 8 is formed. The top shield layer 8 has a thickness of 0.5 to 4.0 μm, for example, and is made of a magnetic material and used for both read head and write head. The top shield layer 8 is made of a soft magnetic material such as NiFe, CoFe, CoFeNi or FeN, and formed through sputtering or plating, for example.

Next, a write gap layer 9 made of an insulating material such as $Al_2O_3$ or $SiO_2$ and having a thickness of 10 to 500 nm, for example, is formed through sputtering, for example, on the top shield layer 8. Next, a portion of the gap layer 9 located in a center portion of a thin-film coil described later is etched to form a contact hole 9a for making a magnetic path.

Next, an insulating layer 10 made of a thermoset photoresist, for example, is formed in a portion in which the thin-film coil is to be formed on the gap layer 9. Next, a first layer 11 of the thin-film coil made of a conductive material such as Cu is formed by frame plating, for example, on the insulating layer 10. An insulating layer 12 made of a thermoset photoresist, for example, is formed to cover the insulating layer 10 and the first layer 11 of the coil. Next, a second layer 13 of the thin-film coil made of a conductive material such as Cu is formed by frame plating, for example, on the insulating layer 12. An insulating layer 14 made of a thermoset photoresist, for example, is formed to cover the insulating layer 12 and the second layer 13 of the coil. The first layer 11 and the second layer 13 of the coil are connected to each other and wound around the contact hole 9a. For example, the total thickness of the first layer 11 and the second layer 13 is 2 to 5 µm and the total thickness of the insulating layers 10, 12 and 14 is 3 to 20 µm.

Next, as shown in FIG. 7A and FIG. 7B, a top pole layer 15 made of a magnetic material and having a thickness of 3 to 5 µm, for example, is formed for the write head. The top pole layer 15 extends from the air bearing surface (the medium facing surface) 20 through the top of the insulating layers 12 and 14 to the contact hole 9a. The top pole layer 15 is made of a soft magnetic material such as NiFe, CoFe, CoFeNi or FeN.

The bottom pole layer (the top shield layer 8) and the top pole layer 15 include portions that are opposed to each other and located on a side of the air bearing surface 20, the gap layer 9 being located between these portions. These portions are the pole portion of the bottom pole layer (the top shield layer 8) and the pole portion of the top pole layer 15. In this embodiment the pole portion of the top pole layer 15 has a width equal to the write track width and defines the write track width. The bottom pole layer (the top shield layer 8) and the top pole layer 15 are magnetically coupled to each other through the contact hole 9a.

Next, as shown in FIG. 8A and FIG. 8B, the gap layer 9 is selectively etched through dry etching, using the pole portion of the top pole layer 15 as a mask. This dry etching may be reactive ion etching (RIE) using a chlorine-base gas such as $BCl_2$ or $Cl_2$, or a fluorine-base gas such as $CF_4$ or $SF_6$, for example. Next, the top shield layer 8 is selectively etched by about 0.3 to 0.6 µm, for example, through argon ion milling, for example. A trim structure as shown in FIG. 8B is thus formed. The trim structure suppresses an increase in the effective track width due to expansion of a magnetic flux generated during writing in a narrow track.

Next, as shown in FIG. 9A and FIG. 9B, a protection layer 16 made of an insulating material such as $Al_2O_3$ or $SiO_2$ and having a thickness of 5 to 50 µm, for example, is formed over the entire surface through sputtering, for example. The surface of the protection layer 16 is flattened and pads (not shown) for electrodes are formed thereon. Finally, lapping of the slider including the foregoing layers is performed to form the air bearing surface 20 of the thin-film magnetic head including the write head and the read head. The thin-film magnetic head of the embodiment is thus completed.

The thin-film magnetic head of the embodiment manufactured through the foregoing steps comprises the medium facing surface (the air bearing surface 20) that faces toward a recording medium, the read head that is a device for reading a magnetic signal, and the write head that is a device for writing a magnetic signal. The read head incorporates: the MR element 5; and the bottom shield layer 3 and the top shield layer 8 for shielding the MR element 5. Portions of the bottom shield layer 3 and the top shield layer 8 that are located on a side of the air bearing surface 20 are opposed to each other, the MR element 5 being placed between these portions. The read head corresponds to the magnetoresistive device of this embodiment, too.

The write head incorporates the bottom pole layer (the top shield layer 8) and the top pole layer 15 that are magnetically coupled to each other, each of which includes at least one layer. The bottom pole layer and the top pole layer 15 include the pole portions that are opposed to each other and placed in regions on a side of the air bearing surface 20. The write head further incorporates: the write gap layer 9 placed between the pole portion of the bottom pole layer and the pole portion of the top pole layer 15; and the thin-film coil (made up of the layers 11 and 13) at least a part of which is placed between the bottom pole layer and the top pole layer 15 and insulated from the bottom pole layer and the top pole layer 15. The pole portion of the top pole layer 15 defines the write track width.

Reference is now made to FIG. 1 to describe the configuration of the read head of this embodiment, that is, the magnetoresistive device of this embodiment. FIG. 1 is a cross section of the magnetoresistive device that is parallel to the air bearing surface.

As shown in FIG. 1, the magnetoresistive device of the embodiment comprises: the MR element 5 having two surfaces 5a and 5b that face toward opposite directions and two side portions 5c and 5d that face toward opposite directions; the two bias field applying layers 27 that are located adjacent to the side portions 5c and 5d of the MR element 5 and apply a longitudinal bias field to the MR element 5; and the two electrode layers 6 that feed a sense current used for magnetic signal detection to the MR element 5, each of the electrode layers 6 being adjacent to one of the surfaces (the top surface of FIG. 1) of each of the bias field applying layers 27. Although in FIG. 1 the electrode layers 6 are located on top of the bias field applying layers 27, the electrode layers 6 are located on the bottom shield gap film 4 in the region in which the bias field applying layers 27 are not located. The magnetoresistive device is covered with the bottom shield gap film 4 and the top shield gap film 7.

According to the description of the embodiment, the structure that the two side portions of the MR element 5 'face toward opposite directions' includes the case in which the side portions of the MR element 5 are parallel to each other and the case in which the side portions 5c and 5d of the MR element 5 are not parallel to each other as shown in FIG. 1.

Each of the two electrode layers 6 is located such that a portion thereof is laid over the surface 5a, that is, one of the surfaces (the top surface of FIG. 1) of the MR element 5 (that is, each of the electrode layers 6 overlaps the surface 5a). The electrode layers 6 are electrically connected to the surface 5a, and isolated from each other by the trench 30 formed between the electrode layers 6.

The magnetoresistive device of the embodiment further comprises two nonconductive layers 28 that are located between the surface 5a of the MR element 5 and the two electrode layers 6 and located in two regions that include ends of the MR element 5 near the side portions 5c and 5d, the two regions being parts of the region in which the electrode layers 6 face toward the surface 5a of the MR element 5.

The MR element 5 is a spin-valve GMR element. The MR element 5 includes: a nonmagnetic layer 24 having two surfaces that face toward opposite directions; a soft magnetic layer (free layer) 25 in which the direction of magnetization varies in response to the signal magnetic field supplied from the recording medium, the soft magnetic layer 25 being adjacent to one of the surfaces (the top surface of FIG. 1) of the nonmagnetic layer 24; a pinned layer 23 whose direction of magnetization is fixed, the pinned layer 23 being adjacent to the other of the surfaces (the bottom surface of FIG. 1) of the nonmagnetic layer 24; and an antiferromagnetic layer 22 that fixes the direction of magnetization of the pinned layer 23, the antiferromagnetic layer 22 being adjacent to one of the surfaces of the pinned layer 23 that is farther from the nonmagnetic layer 24. The MR element 5 further incorporates: a base layer 21 adjacent to one of the surfaces of the antiferromagnetic layer 22 that is farther from the pinned layer 23; and a conductive protection layer 26 adjacent to one of the surfaces of the soft magnetic layer 25 that is farther from the nonmagnetic layer 24. In the MR element 5 of the embodiment, as thus described, the soft magnetic layer 25 is closer to the surface 5a of the MR element 5 than the antiferromagnetic layer 22.

The MR element 5 further incorporates the high resistance layer 31 that is formed through increasing the resistance of a part of the top surface of the protection layer 26 that is located in the region between the two electrode layers 6. The high resistance layer 31 is provided for specular-reflecting electrons and thereby increasing the rate of change in resistance of the MR element 5. Such a spin valve film, in which the high resistance layer 31 is located adjacent to one of the surfaces of the soft magnetic layer 25 that is farther from the nonmagnetic layer 24, is called a specular spin valve film. (See Atsushi Tanaka et al., 'Microstructure Process Techniques and Development of Prototype Head with Reduced Read Core Width', The 9$^{th}$ Research Workshop of The Second Research Division of Association of Super-Advanced Electronics Technologies, Aug. 29, 2000, pp. 65 to 76.)

According to the embodiment, the antiferromagnetic layer 22 has an area greater than that of each of the pinned layer 23, the nonmagnetic layer 24 and the soft magnetic layer 25. The bias field applying layers 27 are located between the antiferromagnetic layer 22 and the electrode layers 6.

According to the description of the embodiment, the expression 'adjacent' includes the case in which two layers directly touch each other and the case in which two layers are next to each other while a bonding layer is located between the two layers.

The base layer 21 has a thickness of 2 to 6 nm, for example, and is made of Ta or NiCr, for example.

The antiferromagnetic layer 22 has a thickness of 5 to 30 nm, for example, and may be made of an antiferromagnetic material including Mn and at least one element $M_{II}$ among the group consisting of Pt, Ru, Rh, Pd, Ni, Au, Ag, Cu, Ir, Cr and Fe. The proportion of Mn preferably falls within the range of 35 to 95 atomic % inclusive. The proportion of the other element $M_{II}$ preferably falls within the range of 5 to 65 atomic % inclusive. Types of antiferromagnetic material include a non-heat-induced antiferromagnetic material that exhibits antiferromagnetism without any heat treatment and that induces an exchange coupling magnetic field between a ferromagnetic material and itself. Another type of antiferromagnetic material is a heat-induced antiferromagnetic material that exhibits antiferromagnetism when heat treatment is given. The antiferromagnetic layer 22 may be made of either of these types.

The non-heat-induced antiferromagnetic material includes an Mn alloy that has a γ phase, such as RuRhMn, FeMn, or IrMn. The heat-induced antiferromagnetic material includes an Mn alloy that has a regular crystal structure, such as PtMn, NiMn, or PtRhMn.

The direction of magnetization is fixed in the pinned layer 23, due to the exchange coupling at the interface between antiferromagnetic layer 22 and the pinned layer 23. The pinned layer 23 may have a structure in which a first ferromagnetic layer, a coupling layer and a second ferromagnetic layer are stacked in this order on the antiferromagnetic layer 22. The first and second ferromagnetic layers may be made of a ferromagnetic material including at least Co among the group consisting of Co and Fe. In particular, it is preferred that the (111) plane of this ferromagnetic material is oriented along the direction in which the layers are stacked. The total thickness of the two ferromagnetic layers is 1.5 to 5 nm, for example. The two ferromagnetic layers are antiferromagnetic-coupled to each other and the directions of magnetization thereof are fixed to opposite directions.

The coupling layer of the pinned layer 23 has a thickness of 0.2 to 1.2 nm, for example, and may be made of a nonmagnetic material including at least one element among the group consisting of Ru, Rh, Ir, Re, Cr and Zr. The coupling layer is provided for creating antiferromagnetic exchange coupling between the first and second ferromagnetic layers, and fixing the magnetizations of these layers in opposite directions. The magnetizations of the first and second ferromagnetic layers in opposite directions include not only the case in which there is a difference of 180 degrees between these directions of magnetizations, but also the case in which there is a difference of 180±20 degrees between them.

The second ferromagnetic layer of the pinned layer 23 may contain a high resistance layer inside the ferromagnetic layer that has magnetism and an electric resistance greater than the other part. This high resistance layer is provided for reflecting at least part of the electrons so as to limit the movement of the electrons and thereby increasing the rate of change in resistance of the MR element 5. It is preferred that the high resistance layer inside the ferromagnetic layer has a thickness of 0.3 to 1 nm, and includes at least one of an oxide, a nitride, and a nitride oxide, which is magnetically stable and capable of reducing variation in output. This high resistance layer may be formed through oxidizing, nitriding, or both oxidizing and nitriding part of the material making the other part of the second ferromagnetic layer.

The nonmagnetic layer 24 has a thickness of 1.0 to 3.0 nm, for example, and may be made of a nonmagnetic conductive material that includes 80 weight % or greater of at least one element among the group consisting of Cu, Au and Ag.

The soft magnetic layer 25 has a thickness of 1.0 to 8.0 nm, for example, and may be made up of a single layer or two layers or more. An example in which the soft magnetic layer 25 is made up of two soft magnetic layers will now be given. One of the two layers that is closer to the nonmagnetic layer 24 is called a first soft magnetic layer. The other one that is closer to the protection layer 26 is called a second soft magnetic layer.

The first soft magnetic layer has a thickness of 0.5 to 3 nm, for example, and may be made of a magnetic material including at least Co among the group consisting of Ni, Co, and Fe. To be specific, the first soft magnetic layer is preferably made of $Co_xFe_yNi_{100-(x+y)}$ in which the (111) plane is oriented along the direction in which the layers are stacked. In the formula, x and y fall within the ranges of $70 \leq x \leq 100$ and $0 \leq y \leq 25$, respectively, in atomic percent.

The second soft magnetic layer has a thickness of 0.5 to 8 nm, for example, and may be made of a magnetic material including at least Ni among the group consisting of Ni, Co, Fe, Ta, Cr, Rh, Mo and Nb. To be specific, the second soft magnetic layer is preferably made of $[Ni_xCo_yFe_{100-(x+y)}]_{100-z}M_{Iz}$. $M_I$ represents at least one of Ta, Cr, Rh, Mo and Nb. In the formula, x, y and z fall within the ranges of $75 \leq x \leq 90$, $0 \leq y \leq 15$, and $0 \leq z \leq 15$, respectively, in atomic percent.

The protection layer 26 has a thickness of 1 to 10 nm, for example, and may be made of Ta. The protection layer 26 may have a two-layer structure made up of a combination of a Ta layer and a Ru layer, for example, or may have a three-layer structure made up of a combination of a Ta layer, a Ru layer, and a Ta layer, for example.

Figure 10:
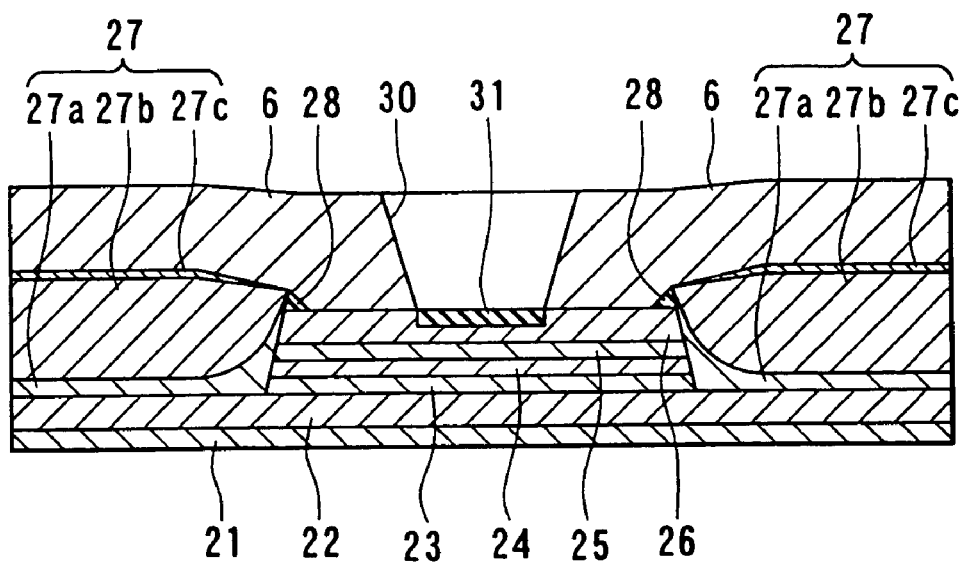
FIG. 10 is a cross section that illustrates an example of the configuration of the bias field applying layers of the magnetoresistive device of the first embodiment.
Figure 11:
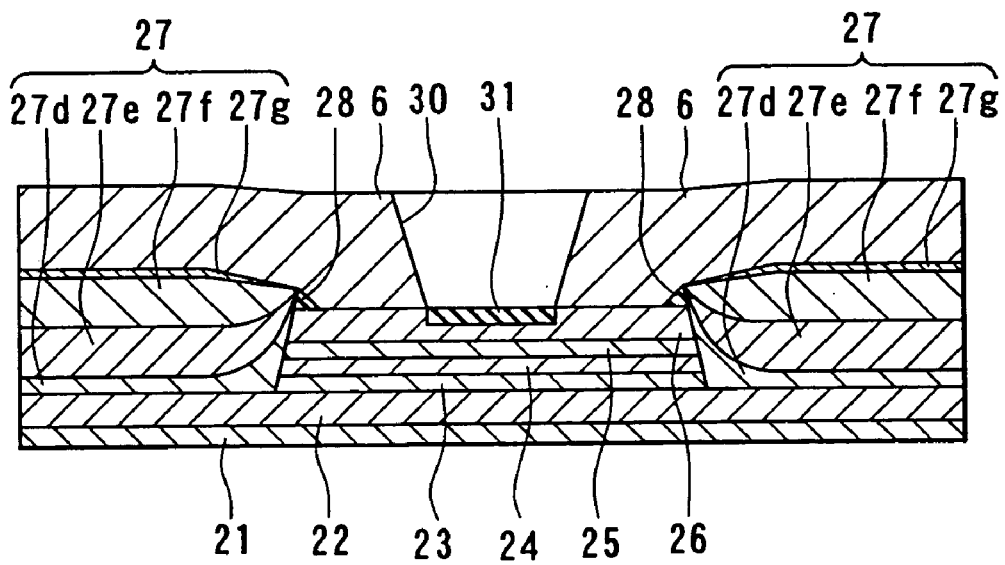
FIG. 11 is a cross section that illustrates another example of the configuration of the bias field applying layers of the magnetoresistive device of the first embodiment.

The bias field applying layers 27 are made up of hard magnetic layers (hard magnets) or a laminate of a ferromagnetic layer and an antiferromagnetic layer, for example. FIG. 10 illustrates an example of the configuration of the bias field applying layers 27 incorporating a hard magnetic layer. FIG. 11 illustrates an example of the bias field applying layers 27 made up of a laminate of a ferromagnetic layer and an antiferromagnetic layer.

The bias field applying layers 27 of the example shown in FIG. 10 has a structure in which the following layers are stacked one by one: a base layer 27a made of a laminate of a Ta layer and a TiW layer, for example; a hard magnetic layer 27b made of CoPt or CoCrPt, for example; and a protection layer 27c made of Ta, for example.

The bias field applying layers 27 of the example shown in FIG. 11 has a structure in which the following layers are stacked one by one: a base layer 27d made of Ta, for example; a ferromagnetic layer 27e made of an NiFe layer, or a laminate of an NiFe layer and a CoFe layer, for example; an antiferromagnetic layer 27f made of an antiferromagnetic material such as IrMn, RuRhMn, or PtMn, for example; and a protection layer 27g made of Ta, for example. The ferromagnetic layer 27e is located on a side of the nonmagnetic layer 24, the pinned layer 23 and the soft magnetic layer 25. The antiferromagnetic layer 27f is located between the ferromagnetic layer 27e and the electrode layer 6. The ferromagnetic layer 27e corresponds to the first layer of the invention. The antiferromagnetic layer 27f corresponds to the second layer of the invention.

Each of the nonconductive layers 28 preferably has a width (the length between an end of the MR element 5 near the side portion 5c or 5d and the other end) of 0.02 to 0.05 μm (20 to 50 nm). The nonconductive layers 28 are made of a nonconductive material, and may be formed through oxidizing part of the material making the protection layer 26.

Each of the electrode layers 6 is made of a laminate of a Ta layer and an Au layer, a laminate of a TiW layer and a Ta layer, or a laminate of a TiN layer and a Ta layer, for example.

Figure 2:
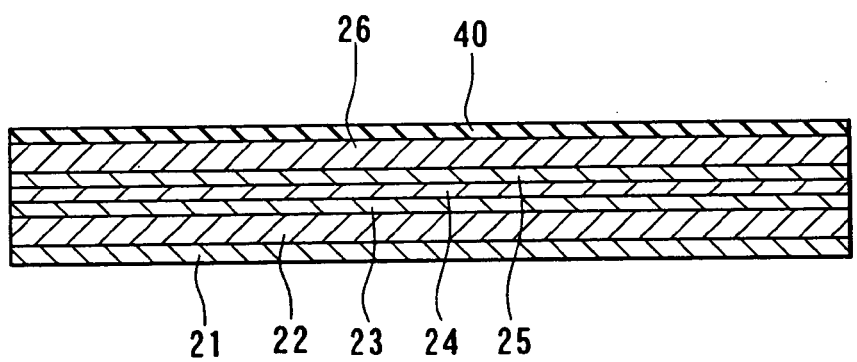
FIG. 2 is a cross section for illustrating a step of a method of manufacturing the magnetoresistive device of the first embodiment.

Reference is now made to FIG. 1 to FIG. 5 to describe a method of manufacturing the magnetoresistive device of the embodiment. In the method, as shown in FIG. 2, the base layer 21, the antiferromagnetic layer 22, the pinned layer 23, the nonmagnetic layer 24, the soft magnetic layer 25 and the protection layer 26 are formed in this order through sputtering, for example, and stacked. The base layer 21 is formed on the bottom shield gap film 4. After the protection layer 26 is formed, part of the top surface thereof is natural-oxidized and the oxide layer 40 is formed.

Examples of thicknesses and materials of the foregoing layers will now be given. The base layer 21 is a 5-nm-thick NiCr layer. The antiferromagnetic layer 22 is a 15-nm-thick PtMn layer. The pinned layer 23 has a structure in which a 1.5-nm-thick CoFe layer that is the first ferromagnetic layer, a 0.8-nm-thick Ru layer that is the coupling layer, a 1-nm-thick CoFe layer and a 2-nm-thick CoFe layer that function as the second ferromagnetic layer are stacked in this order. In the second ferromagnetic layer the oxide layer that is the high resistance layer inside the ferromagnetic layer is formed between the 1-nm-thick CoFe layer and the 2-nm-thick CoFe layer. This oxide layer is formed through oxidizing part of the 1-nm-thick CoFe layer. The nonmagnetic layer 24 is a 2.1-nm-thick Cu layer. The soft magnetic layer 25 is a laminate of a 1-nm-thick CoFe layer and a 2-nm-thick NiFe layer. The protection layer 26 is a 10-nm-thick Ta layer. The oxide layer 40 has a thickness of about 2 to 3 nm.

Figure 3:
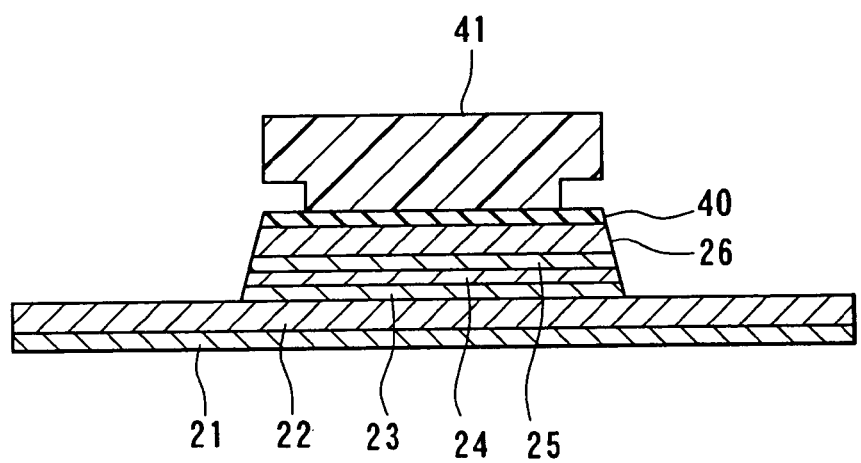
FIG. 3 is a cross section for illustrating a step that follows FIG. 2.

Next, as shown in FIG. 3, a resist mask 41 is formed on the oxide layer 40 through photolithography. The resist mask 41 is used for patterning the layers from the oxide layer 40 to the pinned layer 23. Next, these layers are selectively etched through ion milling, for example, using the resist mask 41, and thereby patterned.

Figure 4:
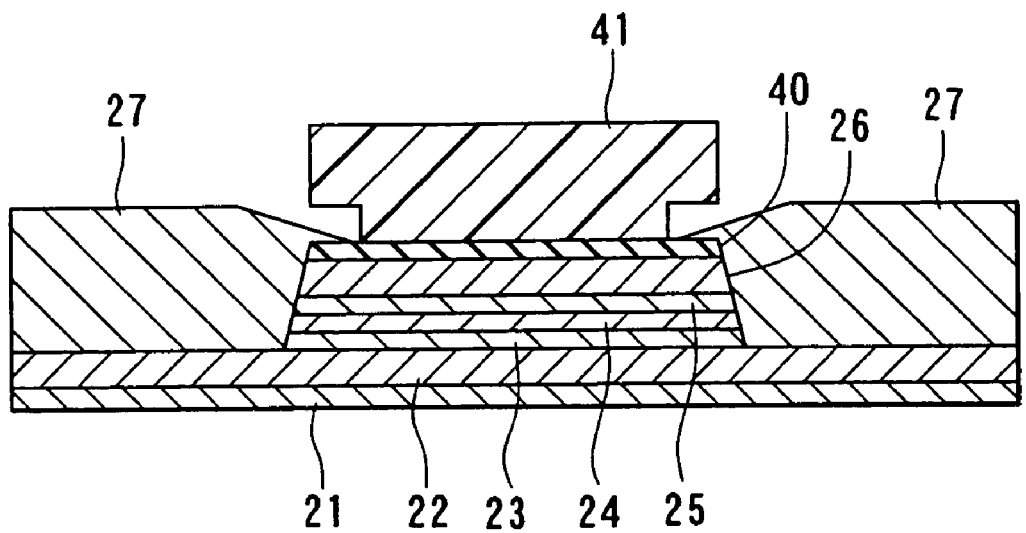
FIG. 4 is a cross section for illustrating a step that follows FIG. 3.

Next, as shown in FIG. 4, on the antiferromagnetic layer 22, the two bias field applying layers 27 are formed on both sides of the layers from the oxide layer 40 to the pinned layer 23 while the resist mask 41 is left unremoved. In this embodiment the bias field applying layers 27 are formed such that parts thereof are laid over the oxide layer 40. Such bias field applying layers 27 may be formed by deposition in a slanting direction with respect to the surface of the antiferromagnetic layer 22 through ion beam deposition (ion beam sputtering).

Figure 5:
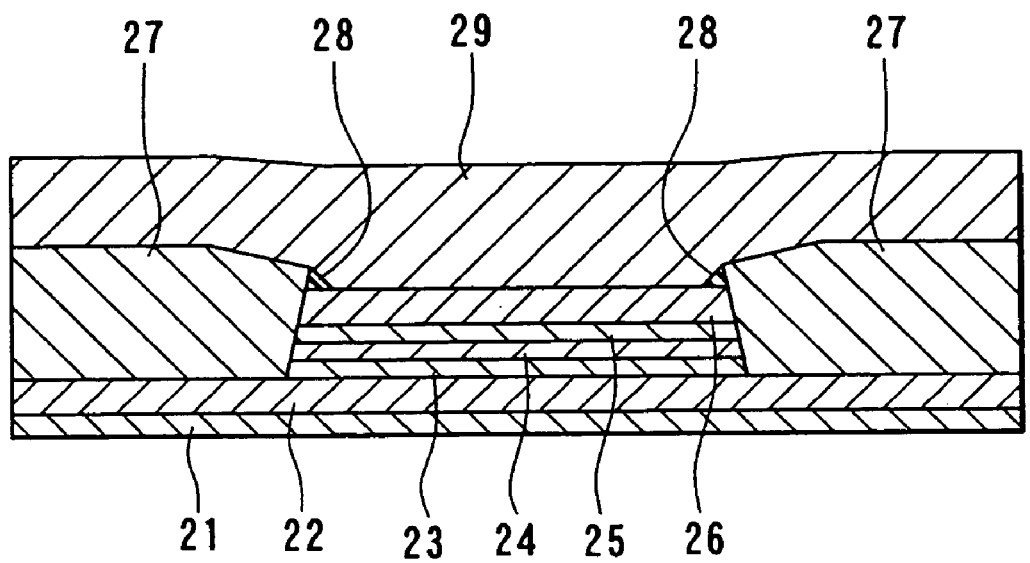
FIG. 5 is a cross section for illustrating a step that follows FIG. 4.

Next, as shown in FIG. 5, the resist mask 41 is removed and the oxide layer 40 is removed through dry etching. The depth to be etched is about 3 nm, and the oxide layer 40 is completely removed except the portions near the ends thereof on sides of the bias field applying layers 27. These portions of the oxide layer 40 remain since parts of the bias field applying layers 27 are laid over the oxide layer 40. The two nonconductive layers 28 are thereby formed. Next, a conductive layer 29 is formed on the bias field applying layers 27 and the protection layer 26. The conductive layer 29 is made of a material of which the electrode layers 6 are made.

Next, as shown in FIG. 1, a specific width of the conductive layer 29 between the two bias field applying layers 27 is etched through reactive ion etching, for example, to form a trench 30. The conductive layer 29 is divided into two by the trench 30, and the two electrode layers 6 are thus formed. In the region between the two electrode layers 6, after this etching, part of the top surface of the protection layer 26 is natural-oxidized and made to have a high resistance, so that the high resistance layer 31 is formed.

The operations of the magnetoresistive device and the thin-film magnetic head of this embodiment will now be described. The thin-film magnetic head writes data on a recording medium through the use of the write head, and reads data stored on the medium through the use of the magnetoresistive device that is the read head.

In the magnetoresistive device the direction of the bias magnetic field created by the bias field applying layers 27 is perpendicular to the direction orthogonal to the air bearing surface 20. In the MR element 5 the direction of magnetization of the soft magnetic layer 25 is equal to the direction of the bias field when no signal magnetic field is present. The direction of magnetization of the pinned layer 23 is fixed to the direction orthogonal to the air bearing surface 20.

In the MR element 5 the direction of magnetization of the soft magnetic layer 25 changes in response to the signal field supplied from the recording medium. The relative angle between the direction of magnetization of the soft magnetic layer 25 and the direction of magnetization of the pinned layer 23 is thereby changed. As a result, the resistance value of the MR element 5 is changed. The resistance value of the MR element 5 is obtained by finding the potential difference between the two electrode layers 6 when a sense current is fed to the MR element 5 from the electrode layers 6. The magnetoresistive device thus reads the data stored on the recording medium.

According to the embodiment, the two electrode layers 6 overlap the surface 5a of the MR element 5. In addition, the two nonconductive layers 28 are provided between the surface 5a of the MR element 5 and the two electrode layers 6 and located in the two regions that include ends of the MR element 5 near the side portions 5c and 5d, the two regions being parts of the region in which the electrode layers 6 face toward the surface 5a of the MR element 5.

According to the embodiment, the bias field applying layers 27 are located on both sides of the MR element 5, so that Barkhausen noise is reduced. However, regions (hereinafter called dead regions) are created near ends of the soft magnetic layer 25 of the MR element 5 that are adjacent to the bias field applying layers 27. In these regions the magnetic field produced from the bias field applying layers 27 fixes the direction of magnetization, and sensing of a signal magnetic field is thereby prevented. The sense current that passes through the dead regions do not contribute to producing outputs of the magnetoresistive device. Therefore, the output of the magnetoresistive device is reduced when a greater sense current passes through the dead regions.

According to the embodiment, the two electrode layers 6 overlap the surface 5a of the MR element 5, so that it is possible to reduce the sense current flowing from the electrode layers 6 through the bias field applying layers 27 into the dead regions of the soft magnetic layer 25. However, even in such a structure, if the nonconductive layers 28 are not provided, it is inevitable that the sense current from the electrode layers 6 flows into the dead regions of the soft magnetic layer 25 to some extent without passing through the bias field applying layers 27.

According to the embodiment, in contrast, the nonconductive layers 28 are provided in the regions corresponding to the dead regions of the soft magnetic layer 25. It is thereby possible to prevent the sense current supplied from the electrode layers 6 from flowing into the dead regions. As a result, according to the embodiment, Barkhausen noise is reduced while a reduction in output is prevented.

When the MR element 5 is the spin-valve GMR element as that of the embodiment, the dead regions are created in the soft magnetic layer 25. Therefore, the effect of the nonconductive layers 28 described above is more remarkable when the soft magnetic layer 25 is located closer to the surface 5a of the MR element 5, that is, closer to the electrode layers 6, than the antiferromagnetic layer 22 as in the embodiment, compared to the case in which the antiferromagnetic layer 22 is located closer to the surface 5a of the MR element 5, that is, closer to the electrode layers 6, than the soft magnetic layer 25.

The following is a description of the configuration of the bias field applying layers 27 that is suitable for more greatly preventing the sense current supplied from the electrode layers 6 from flowing into the dead regions of the soft magnetic layer 25. Each of the bias field applying layers 27 of FIG. 10 has the configuration in which the hard magnetic layer 27b is provided between each of the electrode layers 6 and an end of the soft magnetic layer 25. The resistivity of the material making the hard magnetic layer 27b is relatively low. For example, the resistivity of Co-20Pt (the atomic ratio Co:Pt=1:20) that is the material of the hard magnetic layer 27b is 36 µΩ-cm. The resistivity of Co-8Cr-17Pt (the atomic ratio Co:Cr:Pt=1:8:17) that is the material of the hard magnetic layer 27b is 74 µΩ-cm. The resistivity of Au that is the material of the electrode layers 6 is 5 µΩ-cm. Therefore, in the configuration of the bias field applying layers 27 of FIG. 10, a sense current flows from the electrode layers 6 through the bias field applying layers 27 to the ends of the soft magnetic layer 25 to some extent.

In contrast, each of the bias field applying layers 27 of FIG. 11 has the configuration in which the antiferromagnetic layer 27f is provided between each of the electrode layers 6 and an end of the soft magnetic layer 25. The resistivity of the material making the antiferromagnetic layers 27f is much higher than that of the material of the electrode layers 6. For example, the resistivity of IrMn is 150 µΩ-cm. The resistivity of RuRhMn is 180 µΩ-cm. The resistivity of PtMn is 240 µΩ-cm. Therefore, in the configuration of the bias field applying layers 27 of FIG. 11, it is possible to reduce the sense current that flows from the electrode layers 6 through the bias field applying layers 27 to the ends of the soft magnetic layer 25. This configuration thus prevents the sense current supplied from the electrode layers 6 from flowing into the dead regions of the soft magnetic layer 25. A reduction in output of the magnetoresistive device is thereby prevented with more reliability.

In each of the bias field applying layers 27 incorporating the laminate of the ferromagnetic layer 27e and the antiferromagnetic layer 27f, as shown in FIG. 11, it is preferred that the ferromagnetic layer 27e is located closer to the soft magnetic layer 25 in order to apply a bias field to the soft magnetic layer 25 effectively. If the antiferromagnetic layer 22 is patterned in a manner similar to the way in which the pinned layer 23, the nonmagnetic layer 24 and the soft magnetic layer 25, and the bias field applying layers 27 are formed on the base layer 21 or the bottom shield gap film 4, the ferromagnetic layer 27e is located closer to the antiferromagnetic layer 22, compared to the configuration of FIG. 11. The ferromagnetic layer 27e is therefore located farther from the soft magnetic layer 25.

In the configuration of FIG. 11, in contrast, the antiferromagnetic layer 22 has an area greater than that of each of the pinned layer 23, the nonmagnetic layer 24 and the soft magnetic layer 25. In addition, the bias field applying layers 27 are located between the antiferromagnetic layer 22 and the electrode layers 6. This configuration allows the ferromagnetic layers 27e to be close to the soft magnetic layer 25. A bias field is thereby applied to the soft magnetic layer 25 effectively.

According to the embodiment, the MR element 5 includes the high resistance layer 31 that is formed through increasing the resistance of a part of the top surface of the protection layer 26 located in the region between the two electrode layers 6. The rate of change in resistance of the MR element 5 is thereby increased.

Figure 12:
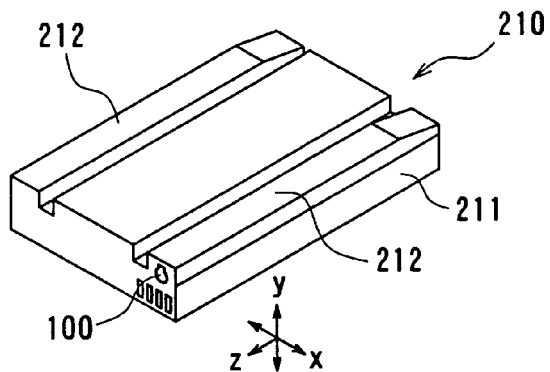
FIG. 12 is a perspective view that illustrates a slider incorporated in a head gimbal assembly of the first embodiment.

A head gimbal assembly and a hard disk drive of the embodiment will now be described. Reference is made to FIG. 12 to describe a slider 210 incorporated in the head gimbal assembly. In the hard disk drive the slider 210 faces toward a hard disk platter that is a circular-plate-shaped recording medium to be rotated and driven. The slider 210 comprises a base body 211 made up mainly of the substrate 1 and the protection layer 16 of FIG. 9A and FIG. 9B. The base body 211 is nearly hexahedron-shaped. One of the six surfaces of the base body 211 faces toward the disk platter. Rails 212 are formed in this one of the surfaces. A surface of each of the rails 212 functions as the air bearing surface. A tapered portion or a stepped portion is formed near the air-inflow-side end (the end located at the upper right of FIG. 12) of each of the rails 212. When the disk platter rotates in the z direction of FIG. 12, an airflow goes into the tapered portion or stepped portion and passes between the disk platter and the slider 210. A lift is thus created below the slider 210 in the y direction by the airflow and exerted on the slider 210. The slider 210 floats over the disk platter by means of the lift. The x direction of FIG. 12 is across the track of the disk platter. A thin-film magnetic head 100 of the embodiment is formed near the air-outflow-side end (the end located at the lower left of FIG. 12) of the slider 210.

Figure 13:
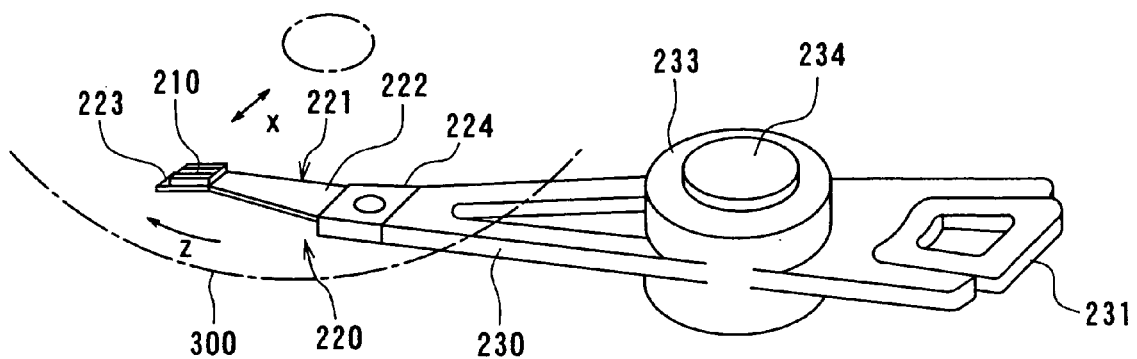
FIG. 13 is a perspective view that illustrates a head arm assembly including the head gimbal assembly of the first embodiment.

Reference is now made to FIG. 13 to describe the head gimbal assembly 220 of the embodiment. The head gimbal assembly 220 comprises the slider 210 and a suspension 221 that flexibly supports the slider 210. The suspension 221 incorporates: a plate-spring-shaped load beam 222 made of stainless steel, for example; a flexure 223 to which the slider 210 is joined, the flexure being located at an end of the load beam 222 and giving an appropriate degree of freedom to the slider 210; and a base plate 224 located at the other end of the load beam 222. The base plate 224 is attached to an arm 230 of an actuator that moves the slider 210 along the x direction across the track of the disk platter 300. The actuator incorporates the arm 230 and a voice coil motor that drives the arm 230. A gimbal section that maintains the orientation of the slider 210 is provided in the portion of the flexure 223 on which the slider 210 is mounted.

The head gimbal assembly 220 is attached to the arm 230 of the actuator. The head gimbal assembly 220 attached to the single arm 230 is called a head arm assembly. A plurality of head gimbal assemblies 220 each attached to a plurality of arms of a carriage are called a head stack assembly.

FIG. 13 illustrates an example of the head arm assembly. In the head arm assembly the head gimbal assembly 220 is attached to an end of the arm 230. A coil 231 that is part of the voice coil motor is fixed to the other end of the arm 230. A bearing 233 is provided in the middle of the arm 230. The bearing 233 is attached to an axis 234 that rotatably supports the arm 230.

Figure 14:
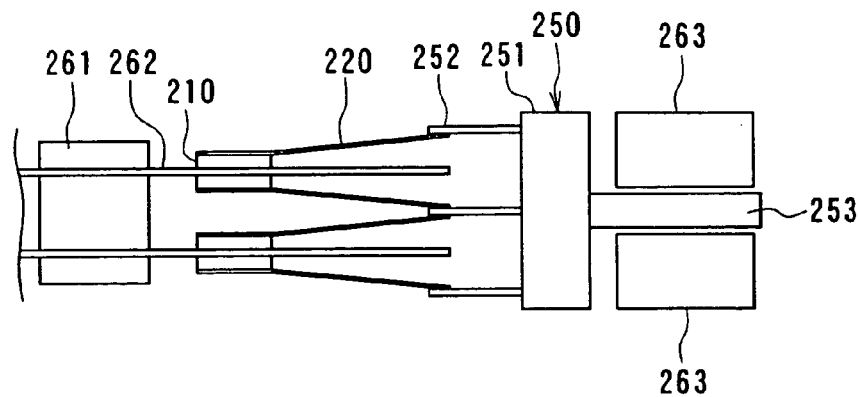
FIG. 14 illustrates the main part of the hard disk drive of the first embodiment.
Figure 15:
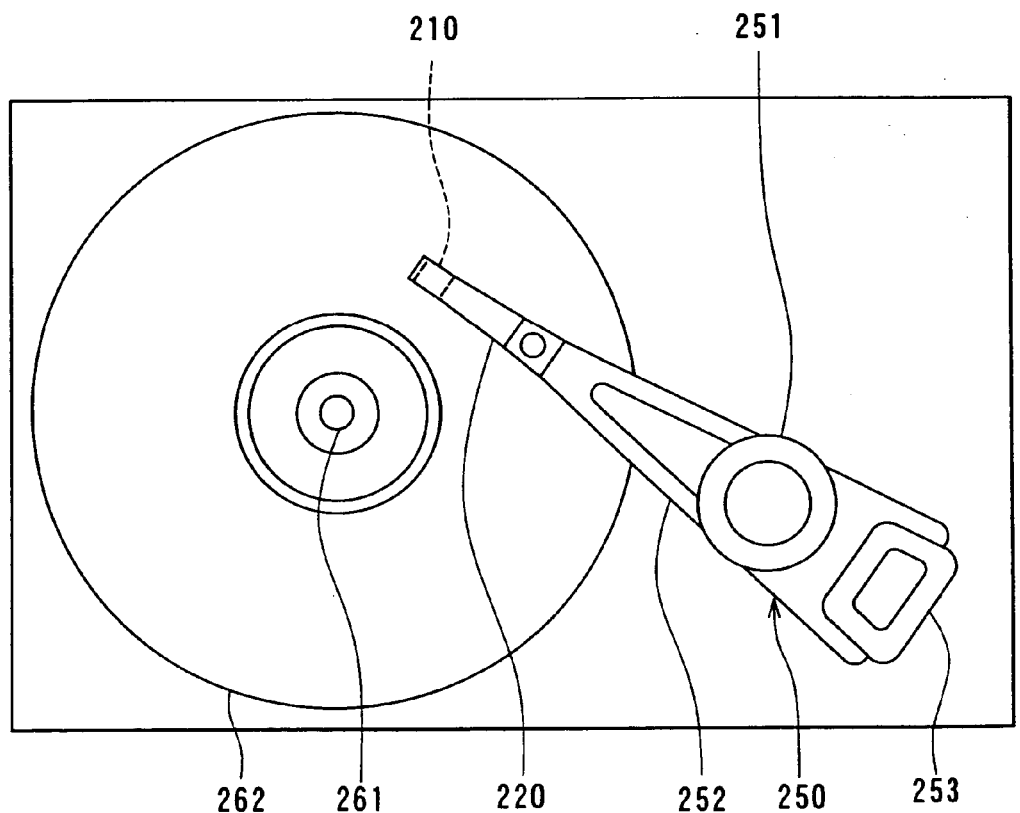
FIG. 15 is a top view of the hard disk drive of the first embodiment.

Reference is now made to FIG. 14 to FIG. 15 to describe an example of the head stack assembly and the hard disk drive of the embodiment. FIG. 14 illustrates the main part of the hard disk drive. FIG. 15 is a top view of the hard disk drive. The head stack assembly 250 incorporates a carriage 251 having a plurality of arms 252. A plurality of head gimbal assemblies 220 are each attached to the arms 252 such that the assemblies 220 are arranged in the vertical direction with spacing between adjacent ones. A coil 253 that is part of the voice coil motor is mounted on the carriage 251 on a side opposite to the arms 252. The head stack assembly 250 is installed in the hard disk drive. The hard disk drive includes a plurality of hard disk platters 262 mounted on a spindle motor 261. Two of the sliders 210 are allocated to each of the platters 262, such that the two sliders 210 face each other with each of the platters 262 in between. The voice coil motor includes permanent magnets 263 located to face each other, the coil 253 of the head stack assembly 250 being placed between the magnets 263.

The head stack assembly 250 except the slider 210 and the actuator correspond to the alignment device of the invention and support the slider 210 and align it with respect to the hard disk platter 262.

In the hard disk drive of the embodiment the actuator moves the slider 210 across the track of the platter 262 and aligns the slider 210 with respect to the platter 262. The thin-film magnetic head incorporated in the slider 210 writes data on the platter 262 through the use of the write head and reads data stored on the platter 262 through the use of the magnetoresistive device that is the read head.

The head gimbal assembly and the hard disk drive of the embodiment exhibit the effects similar to those of the foregoing magnetoresistive device and thin-film magnetic head of the embodiment.

Second Embodiment

Figure 16:
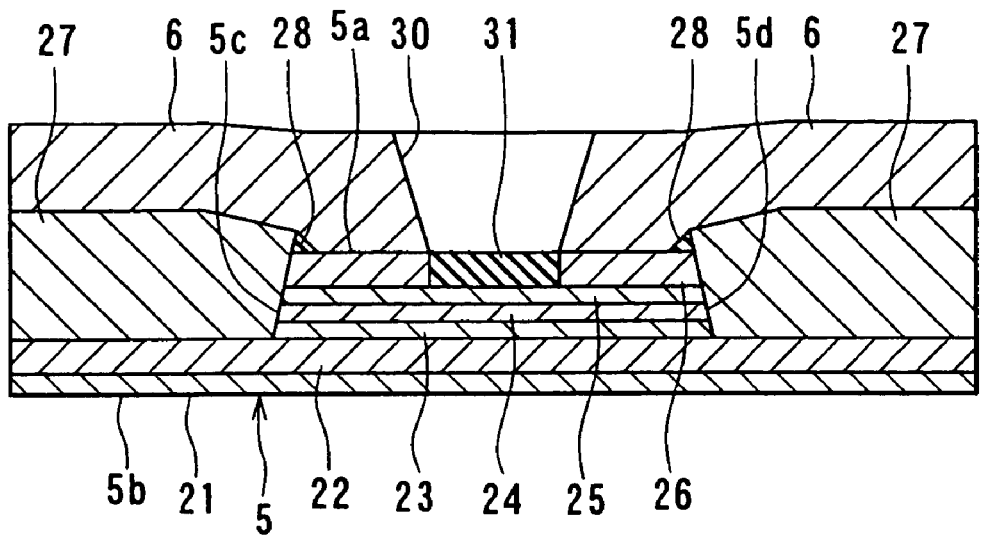
FIG. 16 is a cross section of a magnetoresistive device of a second embodiment of the invention that is parallel to the air bearing surface.

Reference is now made to FIG. 16 to describe a magnetoresistive device and a method of manufacturing the same, a thin-film magnetic head and a method of manufacturing the same, a head gimbal assembly and a hard disk drive of a second embodiment of the invention. FIG. 16 is a cross section of the magnetoresistive device of the embodiment that is parallel to the air bearing surface.

According to the magnetoresistive device of the embodiment, the high resistance layer 31 of the MR element 5 is formed through increasing the resistance of the part of the protection layer 26 located in the region between the two electrode layers 6 entirely.

The method of manufacturing the magnetoresistive device of the second embodiment includes the steps performed until the electrode layers 6 are formed that are similar to those of the first embodiment, as shown in FIG. 1. Through these steps part of the top surface of the protection layer 26 is natural-oxidized and made to have a high resistance, and the high resistance layer 31 is thus formed.

In the following step of the method of the second embodiment, the part of the protection layer 26 located in the region between the two electrode layers 6 is entirely oxidized completely through plasma oxidation or radical oxidation, for example. The part of the protection layer 26 located in this region is thus entirely made to have a high resistance and the high resistance layer 31 is formed.

According to the second embodiment, the high resistance layer 31 is located adjacent to the surface of the soft magnetic layer 25 that is farther from the nonmagnetic layer 24 without fail. As a result, the high resistance layer 31 fully exhibits its effect.

The remainder of configuration, functions and effects of the second embodiment are similar to those of the first embodiment.

Third Embodiment

Figure 17:
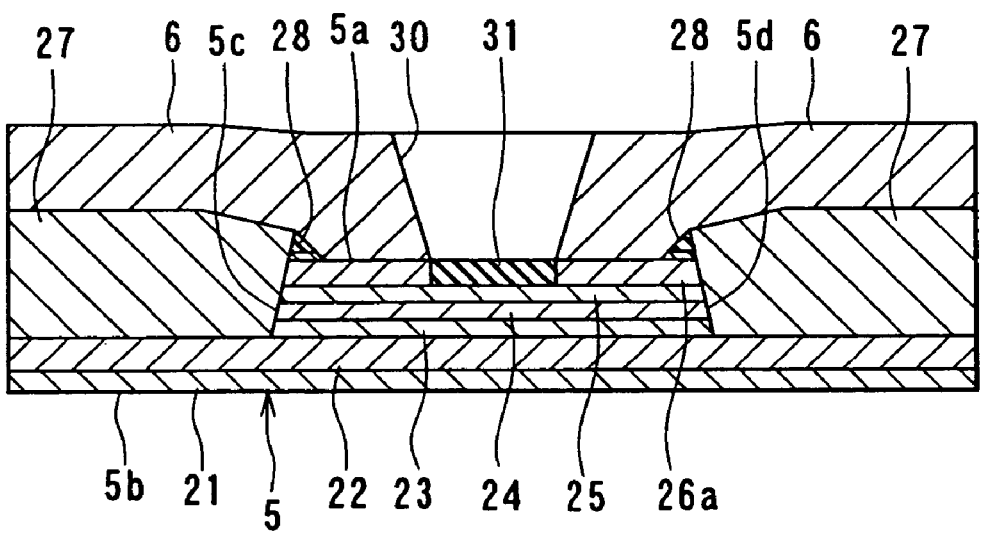
FIG. 17 is a cross section of a magnetoresistive device of a third embodiment of the invention that is parallel to the air bearing surface.

Reference is now made to FIG. 17 to describe a magnetoresistive device and a method of manufacturing the same, a thin-film magnetic head and a method of manufacturing the same, a head gimbal assembly and a hard disk drive of a third embodiment of the invention. FIG. 17 is a cross section of the magnetoresistive device of the embodiment that is parallel to the air bearing surface.

According to the magnetoresistive device of the third embodiment, the protection layer of the MR element 5 is an Al layer 26a. The high resistance layer 31 of the MR element 5 is an $Al_2O_3$ layer. The high resistance layer 31 is formed through increasing the resistance of the part of the Al layer 26a that is the protection layer located in the region between the two electrode layers 6 entirely.

Figure 18:
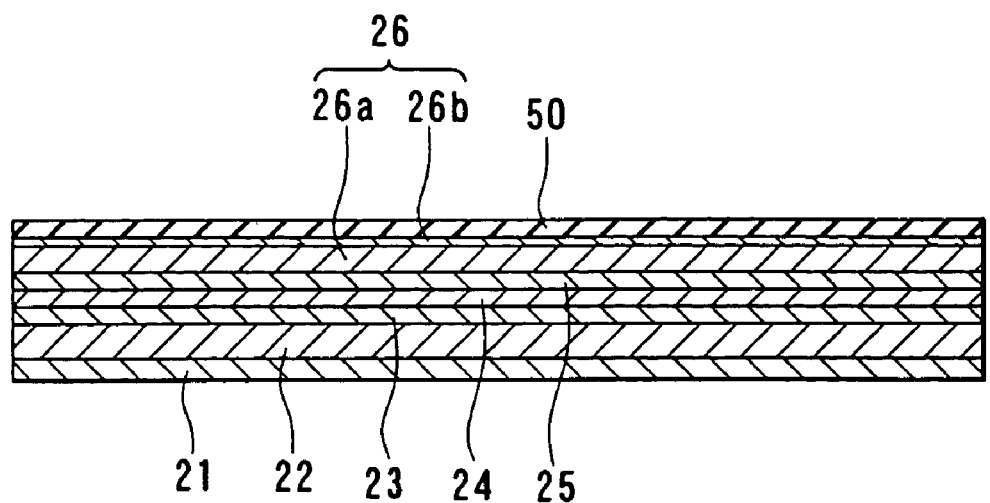
FIG. 18 is a cross section for illustrating a step of a method of manufacturing the magnetoresistive device of the third embodiment.

Reference is now made to FIG. 17 to FIG. 22 to describe a method of manufacturing the magnetoresistive device of the third embodiment. In the method, as shown in FIG. 18, the base layer 21, the antiferromagnetic layer 22, the pinned layer 23, the nonmagnetic layer 24, the soft magnetic layer 25 and the protection layer 26 are formed in this order through sputtering, for example, and stacked. The base layer 21 is formed on the bottom shield gap film 4. The protection layer 26 of the third embodiment is a laminate of the Al layer 26a and a Ta layer 26b. For example, the Al layer 26a has a thickness of 5 nm and the Ta layer 26b has a thickness of 5 nm, too. After the protection layer 26 is formed, part of the top surface thereof, that is, part of the top surface of the Ta layer 26b, is natural-oxidized and an oxide layer 50 is formed. The oxide layer 50 has a thickness of about 2 to 3 nm.

The configurations, thicknesses and materials of the layers from the base layer 21 to the soft magnetic layer 25 are similar to those of the first embodiment.

Figure 19:
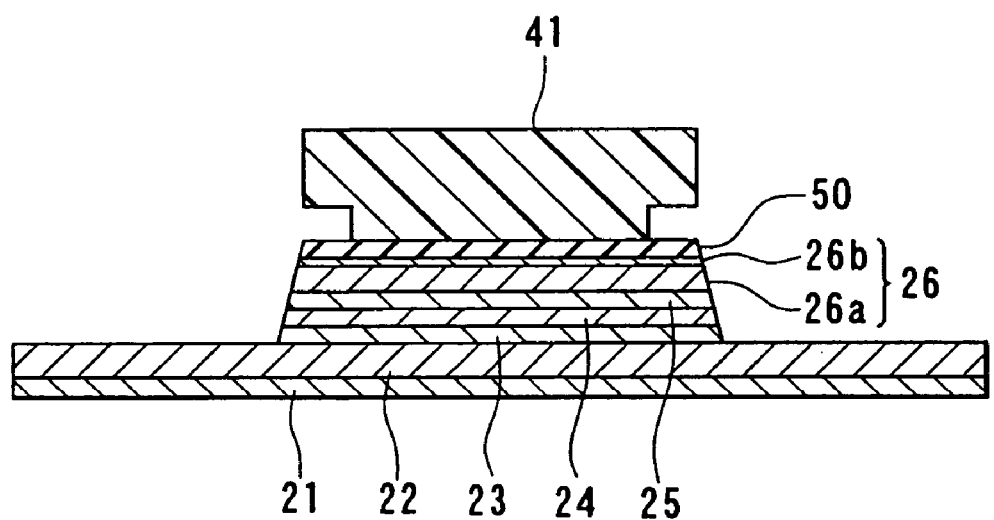
FIG. 19 is a cross section for illustrating a step that follows FIG. 18.

Next, as shown in FIG. 19, the resist mask 41 is formed on the oxide layer 50 through photolithography. The resist mask 41 is used for patterning the layers from the oxide layer 50 to the pinned layer 23. Next, these layers are selectively etched through ion milling, for example, using the resist mask 41, and thereby patterned.

Figure 20:
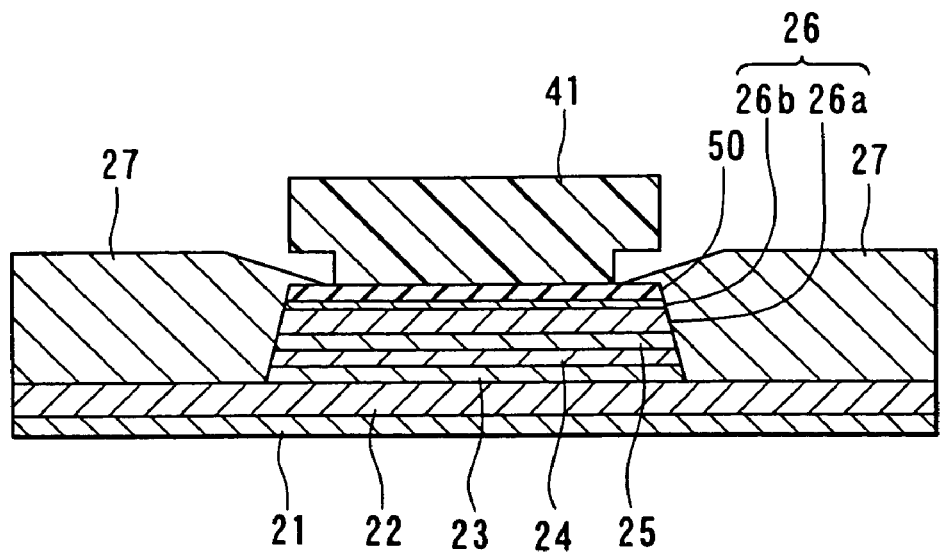
FIG. 20 is a cross section for illustrating a step that follows FIG. 19.

Next, as shown in FIG. 20, on the antiferromagnetic layer 22, the two bias field applying layers 27 are formed on both sides of the layers from the oxide layer 50 to the pinned layer 23 while the resist mask 41 is left unremoved. In this embodiment the bias field applying layers 27 are formed such that parts thereof are laid over the oxide layer 50, as in the first embodiment.

Figure 21:
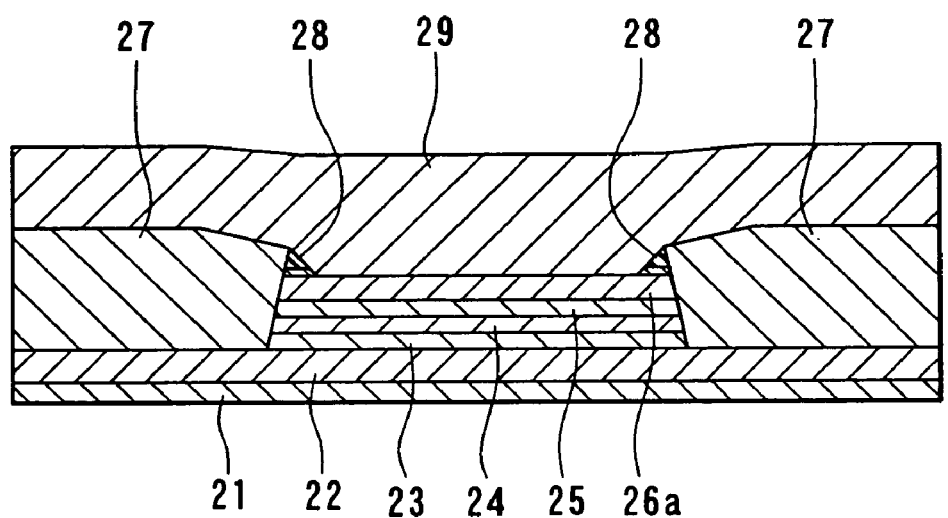
FIG. 21 is a cross section for illustrating a step that follows FIG. 20.

Next, as shown in FIG. 21, the resist mask 41 is removed and the oxide layer 50 and the Ta layer 26b are removed through dry etching. The depth to be etched is about 3 nm, and the oxide layer 50 and the Ta layer 26b are completely removed except the portions near the ends thereof on sides of the bias field applying layers 27. These portions of the oxide layer 50 remain since parts of the bias field applying layers 27 are laid over the oxide layer 50. The two nonconductive layers 28 are thereby formed. Next, the conductive layer 29 is formed on the bias field applying layers 27 and the protection layer 26. The conductive layer 29 is made of a material of which the electrode layers 6 are made.

Figure 22:
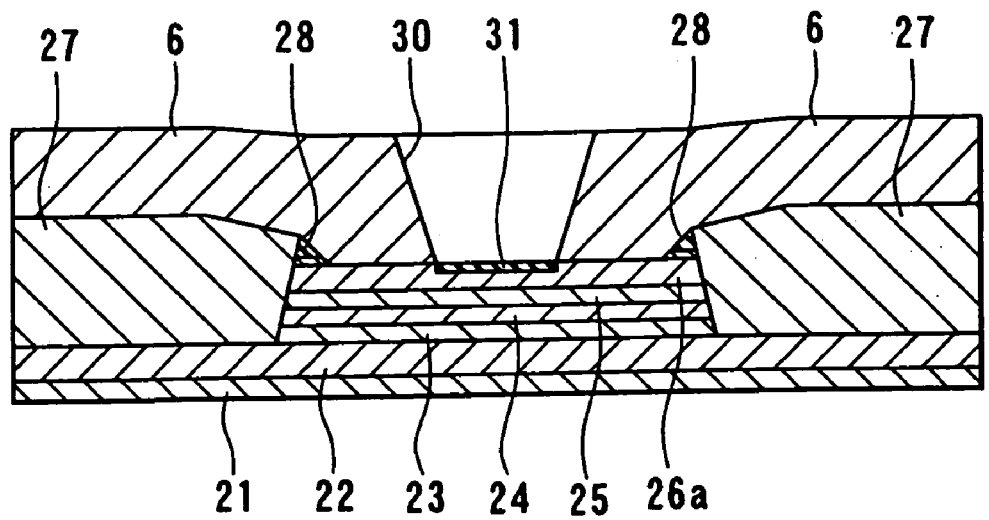
FIG. 22 is a cross section for illustrating a step that follows FIG. 21.
Figure 23:
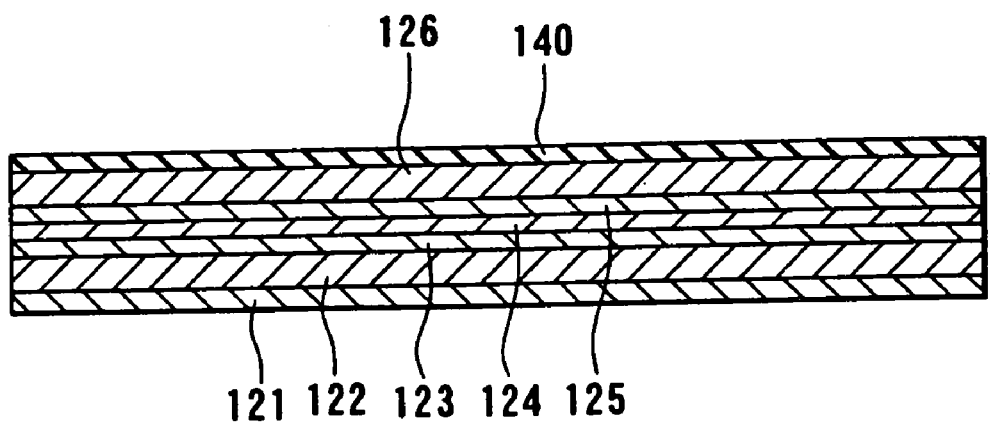
FIG. 23 is a cross section for illustrating a step of a method of manufacturing a read head of the overlapping electrode layer structure.
Figure 24:
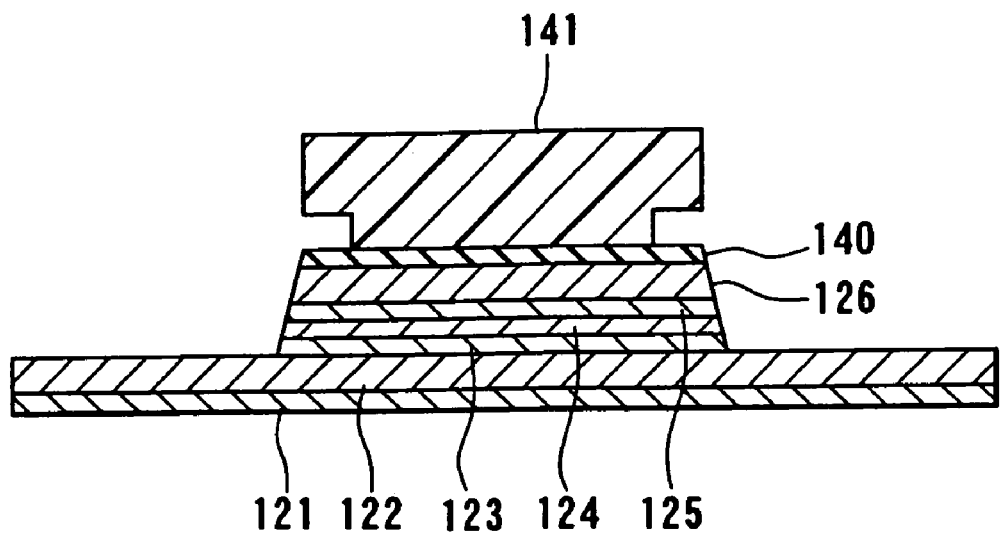
FIG. 24 is a cross section for illustrating a step that follows FIG. 23.
Figure 25:
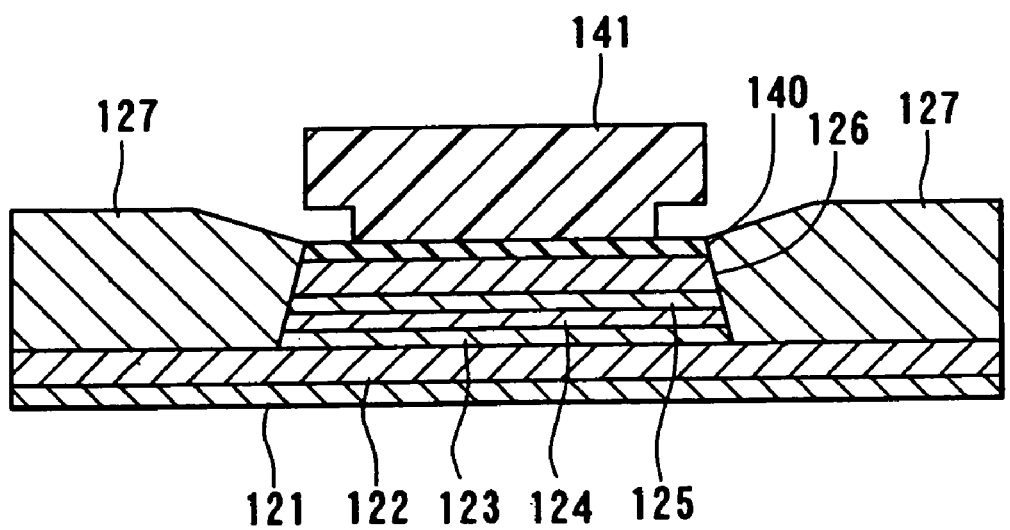
FIG. 25 is a cross section for illustrating a step that follows FIG. 24.
Figure 26:
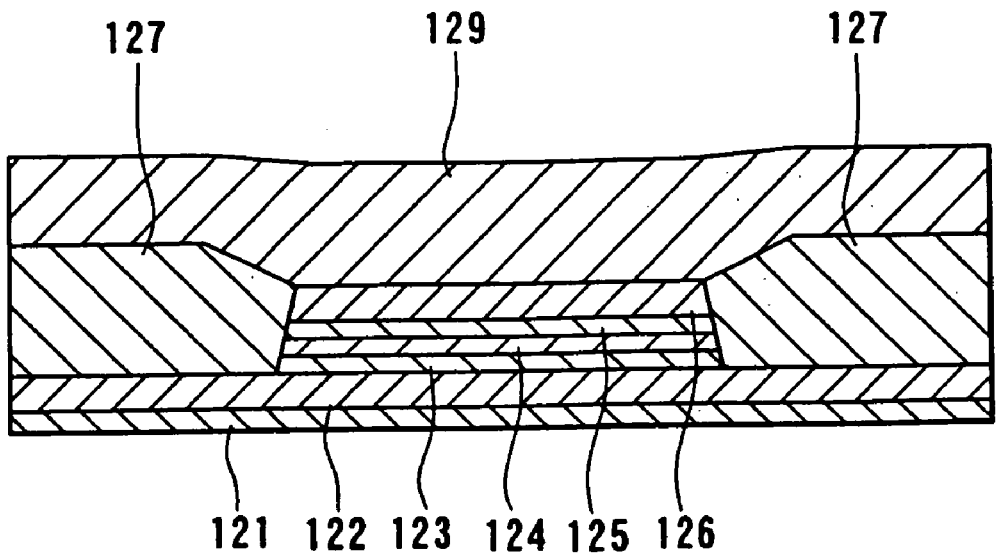
FIG. 26 is a cross section for illustrating a step that follows FIG. 25.
Figure 27:
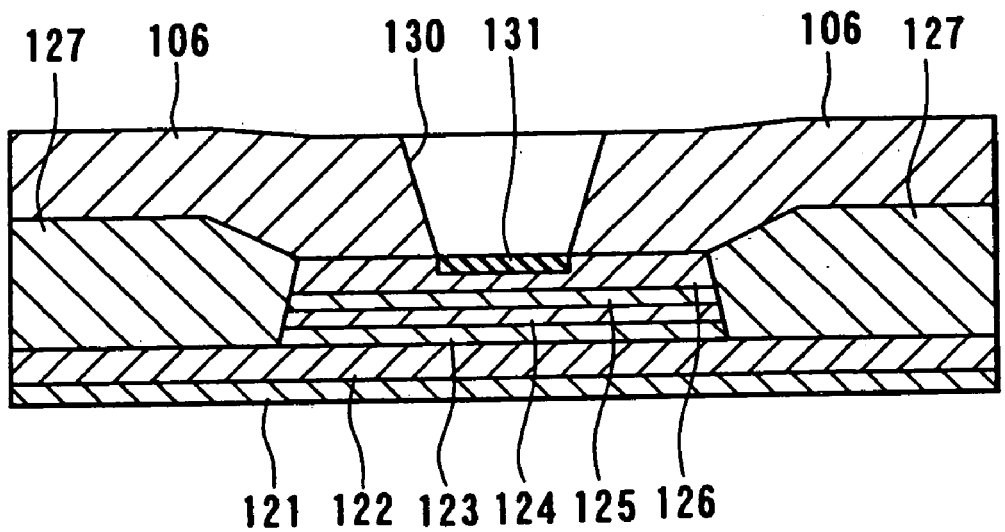
FIG. 27 is a cross section for illustrating a step that follows FIG. 26.

Next, as shown in FIG. 22, a specific width of the conductive layer 29 between the two bias field applying layers 27 is etched through reactive ion etching, for example, to form the trench 30. The conductive layer 29 is divided into two by the trench 30, and the two electrode layers 6 are thus formed. In the region between the two electrode layers 6, after this etching, part of the top surface of the Al layer 26a is natural-oxidized and made to have a high resistance, so that the high resistance layer 31 made of $Al_2O_3$ is formed.

Next, as shown in FIG. 17, the part of the Al layer 26a that is located in the region between the two electrode layers 6 is entirely oxidized completely through plasma oxidation or radical oxidation, for example. The entire Al layer 26a located in this region is thus made to have a high resistance, and the high resistance layer 31 is formed.

The remainder of configuration, functions and effects of the third embodiment are similar to those of the first or second embodiment.

The present invention is not limited to the foregoing embodiments but may be practiced in still other ways. For example, the MR element may be made up of the layers stacked in the order reverse of that of each of the foregoing embodiments.

In the foregoing embodiments, the thin-film magnetic head is disclosed, comprising the MR device for reading formed on the base body and the induction-type electromagnetic transducer for writing stacked on the MR device. Alternatively, the MR device may be stacked on the electromagnetic transducer.

If the thin-film magnetic head is dedicated to reading, the head may comprise the MR device for reading only.

The MR device of the invention is not limited to the read head of the thin-film magnetic head but may be applied to a rotational position sensor, a magnetic sensor, a current sensor, and so on.

According to the magnetoresistive device and the method of manufacturing the same, or the thin-film magnetic head and the method of manufacturing the same, the head gimbal assembly, or the hard disk drive of the invention described so far, the bias field applying layers are located on both sides of the magnetoresistive element, so that Barkhausen noise is reduced. According to the invention, the two electrode layers overlap one of the surfaces of the magnetoresistive element. In addition, the two nonconductive layers are located between the one of the surfaces of the magnetoresistive element and the two electrode layers and located in the two regions that include ends of the magnetoresistive element near the side portions thereof and that are parts of the region in which the electrode layers face toward the one of the surfaces of the magnetoresistive element. As a result, it is possible to prevent a reduction in output due to the current used for magnetic signal detection that passes through the dead regions of the magnetoresistive element. Those features of the invention reduce Barkhausen noise while a reduction in output is prevented.

According to the magnetoresistive device and the method of manufacturing the same, or the thin-film magnetic head and the method of manufacturing the same of the invention, the magnetoresistive element may incorporate the nonmagnetic layer, the soft magnetic layer, the pinned layer and the antiferromagnetic layer, and the soft magnetic layer may be located closer to the one of the surfaces of the magnetoresistive element than the antiferromagnetic layer. In this case, the above-described effect is more remarkable.

According to the magnetoresistive device and the method of manufacturing the same, or the thin-film magnetic head and the method of manufacturing the same of the invention, each of the bias field applying layers may incorporate the first layer made of a ferromagnetic substance and the second layer made of an antiferromagnetic substance wherein the first layer is located on a side of the nonmagnetic layer, the pinned layer and the soft magnetic layer, and the second layer is located between the first layer and each of the electrode layers. In this case, it is possible to reduce the current used for magnetic signal detection that flows from the electrode layers through the bias field applying layers into the ends of the soft magnetic layer, and to prevent a reduction in output with more reliability.

According to the magnetoresistive device and the method of manufacturing the same, or the thin-film magnetic head and the method of manufacturing the same of the invention, the antiferromagnetic layer may have an area greater than that of each of the pinned layer, the nonmagnetic layer and the soft magnetic layer. In addition, the bias field applying layers may be located between the antiferromagnetic layer and the electrode layers. In this case, the ferromagnetic layers of the bias field applying layers are located close to the soft magnetic layer. A bias field is thereby applied to the soft magnetic layer effectively.

According to the magnetoresistive device and the method of manufacturing the same, or the thin-film magnetic head and the method of manufacturing the same of the invention, the magnetoresistive element may further incorporate the conductive protection layer located between the soft magnetic layer and the electrode layers, and the high resistance layer that is formed through increasing the resistance of at least a part of the protection layer located in the region between the two electrode layers. In this case, the rate of change in resistance of the magnetoresistive element is increased.

Obviously many modifications and variations of the present invention are possible in the light of the above teachings. It is therefore to be understood that within the scope of the appended claims the invention may be practiced otherwise than as specifically described.

What is claimed is:

1. A method of manufacturing a magnetoresistive device comprising:
   a magnetoresistive element having two surfaces that face toward opposite directions and two side portions that face toward opposite directions, and incorporating a plurality of layers including a conductive protection layer located uppermost;
   two bias field applying layers that are located adjacent to the side portions of the magnetoresistive element and apply a bias magnetic field to the magnetoresistive element; and
   two electrode layers that feed a current used for magnetic signal detection to the magnetoresistive element, each of the electrode layers being adjacent to one of surfaces of each of the bias field applying layers and overlapping one of the surfaces of the magnetoresistive element; the method comprising the steps of:
   forming the magnetoresistive element;
   forming the two bias field applying layers;
   forming two nonconductive layers in two regions that include ends of the magnetoresistive element near the side portions thereof and that are parts of the one of the surfaces of the magnetoresistive element; and
   forming the two electrode layers such that each of the electrode layers has an area greater than that of each of the nonconductive layers and is located in the one of the surfaces of the magnetoresistive element, wherein:
   the step of forming the magnetoresistive element includes the step of forming an oxide layer by oxidizing part of a top surface of the protection layer,
   in the step of forming the bias field applying layers, the bias field applying layers are formed such that parts thereof are laid over the oxide layer, and
   in the step of forming the nonconductive layers, the oxide layer is removed by etching except for portions thereof to be the nonconductive layers, the portions remaining because of the parts of the bias field applying layers laid over the oxide layer.

2. The method according to claim 1 wherein:
   the magnetoresistive element is formed to incorporate: a nonmagnetic layer having two surfaces that face toward opposite directions; a soft magnetic layer adjacent to one of the surfaces of the nonmagnetic layer; a pinned layer, located adjacent to the other one of the surfaces of the nonmagnetic layer, whose direction of magnetization is fixed; and an antiferromagnetic layer located adjacent to one of surfaces of the pinned layer that is farther from the nonmagnetic layer, the antiferromagnetic layer fixing the direction of magnetization of the pinned layer; and
   the soft magnetic layer is located closer to the one of the surfaces of the magnetoresistive element than the antiferromagnetic layer.

3. The method according to claim 2 wherein each of the bias field applying layers is formed to incorporate a first layer made of a ferromagnetic substance and a second layer made of an antiferromagnetic substance wherein the first layer is located on a side of the nonmagnetic layer, the pinned layer and the soft magnetic layer, and the second layer is located between the first layer and each of the electrode layers.

4. The method according to claim 3 wherein the antiferromagnetic layer is formed to have an area greater than that of each of the pinned layer, the nonmagnetic layer and the soft magnetic layer, and each of the bias field applying layers is located between the antiferromagnetic layer and each of the electrode layers.

5. The method according to claim 2 wherein the protection layer is located between the soft magnetic layer and the electrode layers,
   the method further comprising the step of forming a high resistance layer through increasing the resistance of at least a part of the protection layer located in a region between the two electrode layers.

6. A method of manufacturing a thin-film magnetic head comprising a magnetoresistive device that is a device for reading a magnetic signal, the magnetoresistive device comprising:
   a magnetoresistive element having two surfaces that face toward opposite directions and two side portions that face toward opposite directions, and incorporating a plurality of layers including a conductive protection layer located uppermost;
   two bias field applying layers that are located adjacent to the side portions of the magnetoresistive element and apply a bias magnetic field to the magnetoresistive element; and
   two electrode layers that feed a current used for magnetic signal detection to the magnetoresistive element, each of the electrode layers being adjacent to one of surfaces of each of the bias field applying layers and overlapping one of the surfaces of the magnetoresistive element; the method comprising the steps of:
   forming the magnetoresistive element;
   forming the two bias field applying layers;
   forming two nonconductive layers in two regions that include ends of the magnetoresistive element near the side portions thereof and that are parts of the one of the surfaces of the magnetoresistive element; and
   forming the two electrode layers such that each of the electrode layers has an area greater than that of each of the nonconductive layers and is located in the one of the surfaces of the magnetoresistive element, wherein:
   the step of forming the magnetoresistive element includes the step of forming an oxide layer by oxidizing part of a top surface of the protection layer,
   in the step of forming the bias field applying layers, the bias field applying layers are formed such that parts thereof are laid over the oxide layer, and
   in the step of forming the nonconductive layers, the oxide layer is removed by etching except for portions thereof to be the nonconductive layers, the portions remaining because of the parts of the bias field applying layers laid over the oxide layer.

7. The method according to claim 6 wherein:
   the magnetoresistive element is formed to incorporate: a nonmagnetic layer having two surfaces that face toward opposite directions; a soft magnetic layer adjacent to one of the surfaces of the nonmagnetic layer; a pinned layer, located adjacent to the other one of the surfaces of the nonmagnetic layer, whose direction of magnetization is fixed; and an antiferromagnetic layer located adjacent to one of surfaces of the pinned layer that is farther from the nonmagnetic layer, the antiferromagnetic layer fixing the direction of magnetization of the pinned layer; and
   the soft magnetic layer is located closer to the one of the surfaces of the magnetoresistive element than the antiferromagnetic layer.

8. The method according to claim 7 wherein each of the bias field applying layers is formed to incorporate a first layer made of a ferromagnetic substance and a second layer made of an antiferromagnetic substance wherein the first layer is located on a side of the nonmagnetic layer, the pinned layer and the soft magnetic layer, and the second layer is located between the first layer and each of the electrode layers.

9. The method according to claim 8 wherein the antiferromagnetic layer is formed to have an area greater than that of each of the pinned layer, the nonmagnetic layer and the soft magnetic layer, and each of the bias field applying layers is located between the antiferromagnetic layer and each of the electrode layers.

10. The method according to claim 7 wherein the protection layer is located between the soft magnetic layer and the electrode layers, the method further comprising the step of forming a high resistance layer through increasing the resistance of at least a part of the protection layer located in a region between the two electrode layers.

* * * * *